United States Patent
Cranfill et al.

(10) Patent No.: US 11,023,091 B2
(45) Date of Patent: Jun. 1, 2021

(54) DEVICE, METHOD, AND GRAPHICAL USER INTERFACE FOR IMPROVING VISIBILITY OF AFFORDANCES

(71) Applicant: Apple Inc., Cupertino, CA (US)

(72) Inventors: Elizabeth Caroline Cranfill, San Francisco, CA (US); Conor Hughes, Oakland, CA (US); Lauren Trottier, San Jose, CA (US); Clare Kasemset, Mountain View, CA (US); Christopher B. Fleizach, Gilroy, CA (US)

(73) Assignee: APPLE INC., Cupertino, CA (US)

( * ) Notice: Subject to any disclaimer, the term of this patent is extended or adjusted under 35 U.S.C. 154(b) by 199 days.

(21) Appl. No.: 15/978,116

(22) Filed: May 12, 2018

(65) Prior Publication Data

US 2018/0348962 A1    Dec. 6, 2018

Related U.S. Application Data

(60) Provisional application No. 62/514,564, filed on Jun. 2, 2017.

(51) Int. Cl.
*G06F 3/0481* (2013.01)
*G06F 3/0484* (2013.01)
(Continued)

(52) U.S. Cl.
CPC .......... *G06F 3/0481* (2013.01); *G06F 3/0482* (2013.01); *G06F 3/04847* (2013.01);
(Continued)

(58) Field of Classification Search
CPC ......... G06F 2203/04801; G06F 3/0481; G06F 40/103; G06F 3/0482; G06F 3/04847;
(Continued)

(56) References Cited

U.S. PATENT DOCUMENTS

| 6,704,034 B1* | 3/2004 | Rodriguez | ............ G06F 40/103 |
| | | | 715/860 |
| 2002/0152255 A1* | 10/2002 | Smith, Jr. | ......... H04M 3/42068 |
| | | | 718/102 |

(Continued)

OTHER PUBLICATIONS

Immich, T. ("Immich"), "Resolution Independent Icon Design—Part 2: Pixels vs. Vectors," published on Sep. 5, 2008. <URL= https://www.centigrade.de/en/blog/resolution-independent-icon-design-part-2/> (Year: 2008).*

*Primary Examiner* — James T Tsai

(74) *Attorney, Agent, or Firm* — Fernando & Partners, LLP

(57) ABSTRACT

An electronic device displays a user interface that includes a plurality of affordances including a first affordance. The first affordance is selectable to perform a respective operation. The first affordance is displayed at a first size. The device receives a user input at a location corresponding to the first affordance. In response to receiving the user input and in accordance with a determination that a text display setting has a first value, the device displays an overlay that includes an enlarged representation of the first affordance. The enlarged representation of the first affordance has a second size that is bigger than the first size. In response to receiving the user input and in accordance with a determination that the text display setting has a second value that is different from the first value, the device forgoes display of the enlarged representation of the first affordance.

23 Claims, 25 Drawing Sheets

(51) Int. Cl.
    *G06F 3/0482*      (2013.01)
    *G06F 3/0488*      (2013.01)
    *G06F 40/103*      (2020.01)

(52) U.S. Cl.
    CPC ........ *G06F 3/04883* (2013.01); *G06F 40/103* (2020.01); *G06F 3/04886* (2013.01); *G06F 2203/04805* (2013.01); *G06F 2203/04806* (2013.01)

(58) Field of Classification Search
    CPC ............ G06F 3/04883; G06F 3/04886; G06F 2203/04805; G06F 2203/04806
    See application file for complete search history.

(56) References Cited

U.S. PATENT DOCUMENTS

| | | | | |
|---|---|---|---|---|
| 2006/0241837 | A1* | 10/2006 | Jarrett | A01B 63/00 701/50 |
| 2007/0079255 | A1* | 4/2007 | Gourdol | G06F 9/451 715/815 |
| 2007/0177804 | A1* | 8/2007 | Elias | G06F 3/04883 382/188 |
| 2007/0188519 | A1* | 8/2007 | Kii | G06F 1/1626 345/619 |
| 2010/0199215 | A1* | 8/2010 | Seymour | G06F 3/0481 715/808 |
| 2011/0141031 | A1* | 6/2011 | McCullough | G06F 3/0481 345/173 |
| 2011/0222087 | A1* | 9/2011 | Gelphman | G06F 3/04847 358/1.12 |
| 2012/0062599 | A1* | 3/2012 | Machida | G06F 1/1643 345/655 |
| 2013/0104029 | A1* | 4/2013 | Hendry | G06F 40/166 715/234 |
| 2013/0227483 | A1* | 8/2013 | Thorsander | G06F 3/0482 715/821 |
| 2014/0192244 | A1* | 7/2014 | Ishihara | G06F 3/0488 348/333.02 |
| 2014/0282285 | A1* | 9/2014 | Sadhvani | G06F 3/04847 715/865 |
| 2014/0337800 | A1* | 11/2014 | Gray | G06K 9/2081 715/835 |
| 2015/0082162 | A1* | 3/2015 | Cho | G06F 3/016 715/702 |
| 2015/0135125 | A1* | 5/2015 | Bhatt | G06F 3/0481 715/781 |
| 2015/0378976 | A1* | 12/2015 | Lockhart | G06F 16/9577 715/221 |
| 2016/0092071 | A1* | 3/2016 | Lawson | G06F 3/0482 345/156 |
| 2016/0349970 | A1* | 12/2016 | Everitt | G06F 40/166 |
| 2017/0038926 | A1* | 2/2017 | Fram | G06F 3/0487 |
| 2017/0083229 | A1* | 3/2017 | Luo | G06F 3/04842 |
| 2017/0116666 | A1* | 4/2017 | Lawson | G06Q 20/127 |
| 2017/0371975 | A1* | 12/2017 | Chen | G06F 16/9574 |

\* cited by examiner

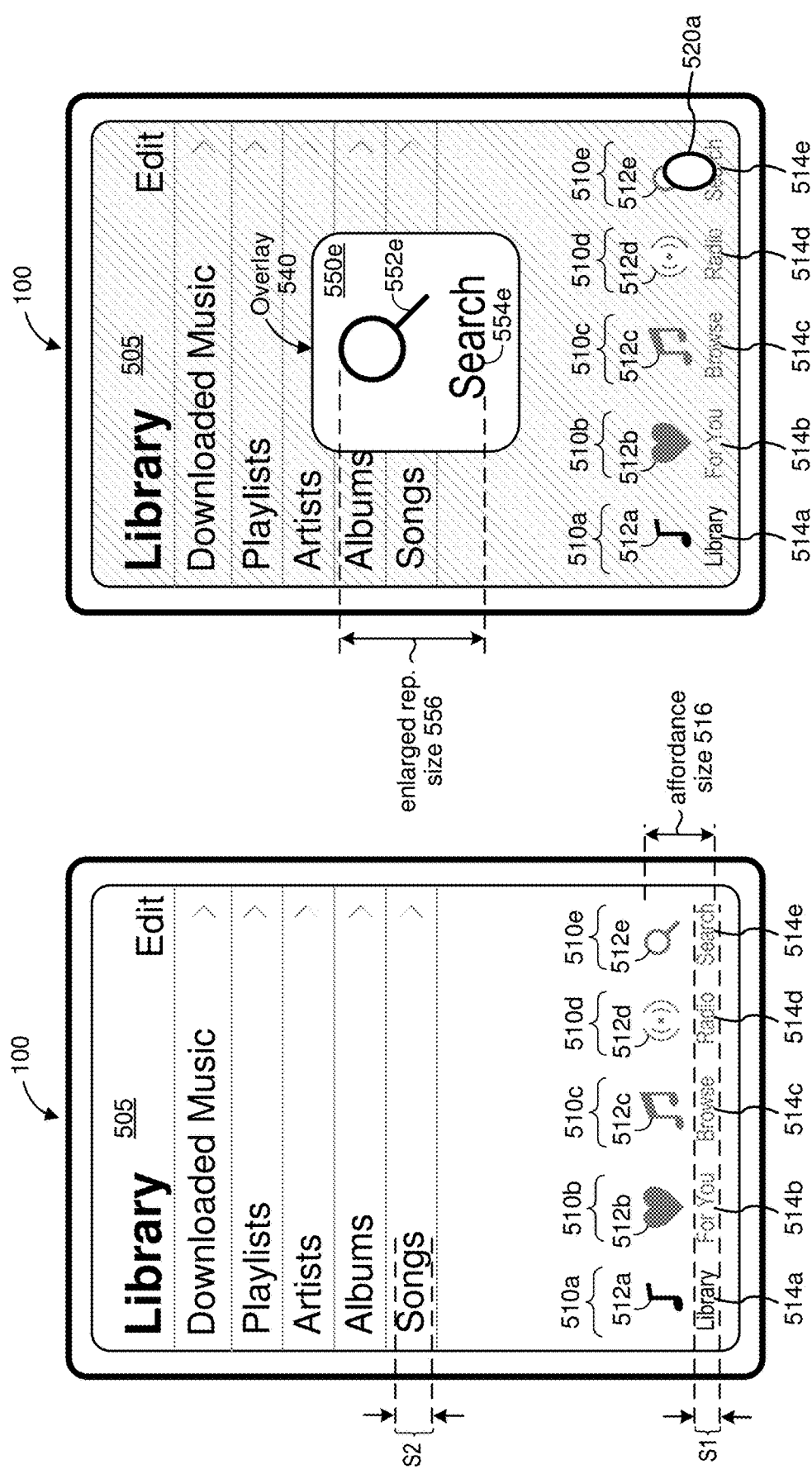

600

---

602 — At a device including a display, a non-transitory memory, and one or more processors coupled with the display and the non-transitory memory:

Display a user interface of a first application that includes a plurality of affordances including a first affordance, wherein the first affordance is selectable to perform a respective operation associated with the first affordance and the first affordance is displayed at a first size on the display in the user interface of the first application (A)

↓

604 — Receive a user input at a location that corresponds to the first affordance (B)

↓

606 — In response to receiving the input:

In accordance with a determination that a text display setting has a first value, display an overlay that includes an enlarged representation of the first affordance, wherein the enlarged representation of the first affordance has a second size that is bigger than the first size; and In accordance with a determination that the text display setting has a second value that is different from the first value, forgo display of the enlarged representation of the first affordance (C)

DEVICE, METHOD, AND GRAPHICAL USER INTERFACE FOR IMPROVING VISIBILITY OF AFFORDANCES

RELATED APPLICATION

This application claims priority to U.S. Provisional Patent Application No. 62/514,564, filed on Jun. 2, 2017, entitled "Device, Method, and Graphical User Interface for Improving Visibility of Affordances," the entire contents of which are incorporated herein by reference.

TECHNICAL FIELD

The present disclosure relates generally to electronic devices with touch-sensitive surfaces, including but not limited to electronic devices with touch-sensitive surfaces that display affordances.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for improving visibility of affordances. Such methods and interfaces optionally complement or replace conventional methods for displaying affordances. Such methods and interfaces reduce the cognitive burden on a user and produce a more efficient human-machine interface. Such methods and interfaces improve the visibility of the affordances thereby improving the operability of the device. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with a display, a non-transitory memory and one or more processors coupled with the display and the non-transitory memory. The method includes displaying a user interface of a first application that includes a plurality of affordances including a first affordance. The first affordance is selectable to perform a respective operation associated with the first affordance and the first affordance is displayed at a first size on the display in the user interface of the first application. The method includes receiving a user input at a location that corresponds to the first affordance. In response to receiving the user input and in accordance with a determination that a text display setting has a first value, the method includes displaying an overlay that includes an enlarged representation of the first affordance. The enlarged representation of the first affordance has a second size that is bigger than the first size. In response to receiving the user input and in accordance with a determination that the text display setting has a second value that is different from the first value, the method includes forgoing display of the enlarged representation of the first affordance.

In accordance with some embodiments, an electronic device includes a display unit configured to display a user interface, one or more input units configured to receive user inputs, and a processing unit coupled with the display unit and the one or more input units. The processing unit is configured to enable display of, in a display area on the display unit, a user interface of a first application that includes a plurality of affordances including a first affordance. The first affordance is selectable to perform a respective operation associated with the first affordance and the first affordance is displayed at a first size on the display in the user interface of the first application. The processing unit is also configured to receive a user input at a location that corresponds to the first affordance. In response to receiving the user input and in accordance with a determination that a text display setting has a first value, the processing unit is further configured to display an overlay that includes an enlarged representation of the first affordance. The enlarged representation of the first affordance has a second size that is bigger than the first size. In response to receiving the user input and in accordance with a determination that the text display setting has a second value that is different from the first value, the processing unit is further configured to forgo display of the enlarged representation of the first affordance.

Thus, electronic devices with displays and input devices are provided with faster, more efficient methods and interfaces for displaying affordances in accessibility mode. Such electronic devices improve the visibility of the affordances thereby improving the operability of the electronic devices. Such methods and interfaces may complement or replace conventional methods for displaying affordances in accessibility mode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams illustrating a method of displaying affordances in accordance with some embodiments.

DESCRIPTION OF EMBODIMENTS

Figure 1A:
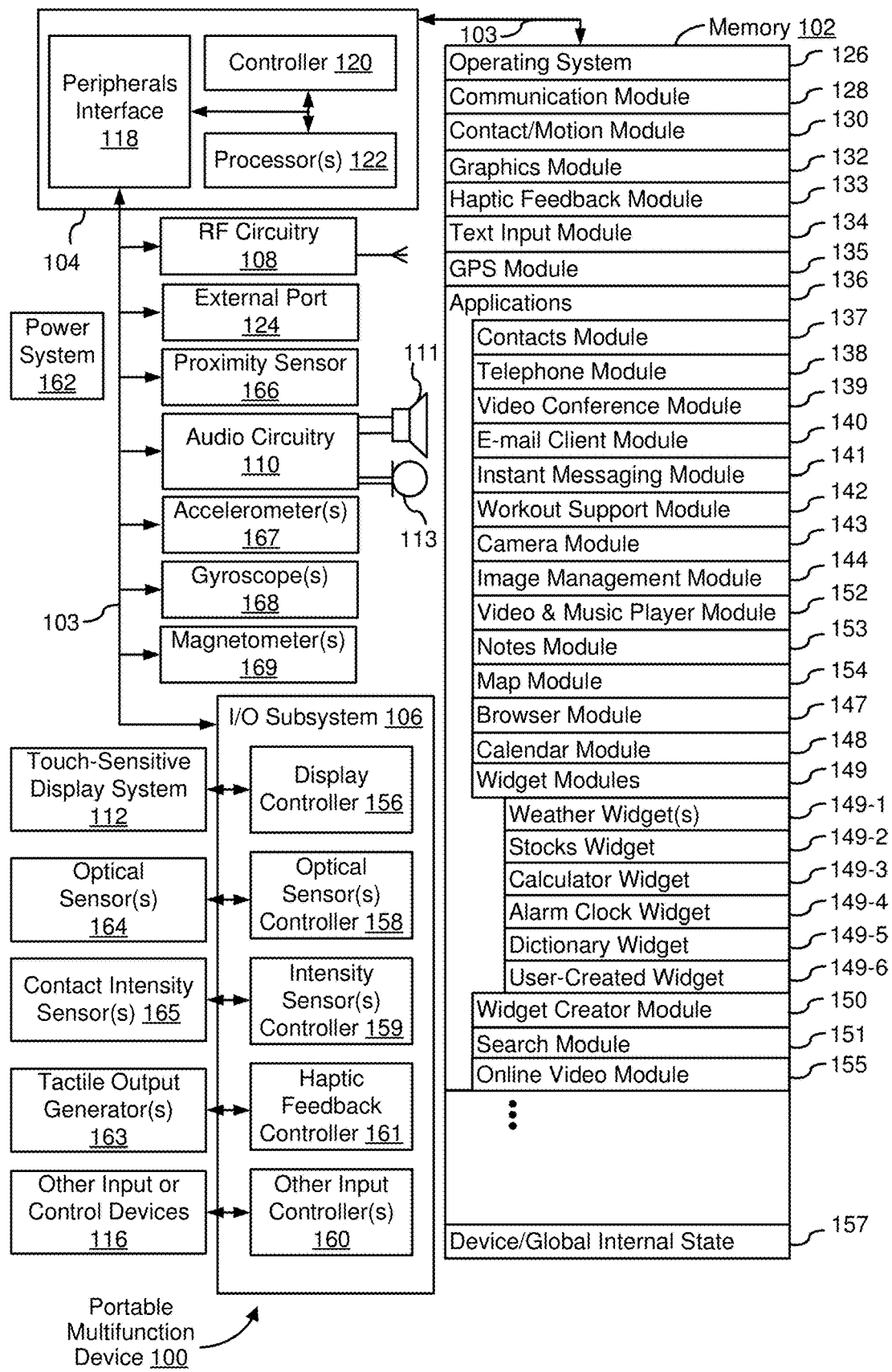
FIG. 1A is a block diagram illustrating a portable multifunction device with a touch-sensitive display in accordance with some embodiments.

Typically, a user can adjust a text display setting to adjust a text size of text that is displayed on the device. However, the text size of text that is part of an affordance is typically limited by a size of the affordance. As such, typical adjustments to the text display setting do not improve the visibility of text that is part of an affordance to the same extent as text that is not part of the affordance. Accordingly, in some embodiments described below, the device displays an overlay that includes an enlarged representation of an affordance. Displaying the overlay allows the device to display an enlarged representation of the text that is part of the affordance. Since the enlarged representation of the text is not limited by the size of the affordance, displaying the overlay improves the visibility of the affordance. Improving the visibility of the affordance makes it easier for the user to see the affordance thereby improving the user experience.

Below, a description of example devices illustrated in FIGS. 1A-1B, 2, and 3 is provided. FIGS. 4A-4B, and 5A-5X illustrate example user interfaces for displaying affordances in accessibility mode. FIGS. 6A-6E illustrate a flow diagram of a method of displaying affordances in accessibility mode. The user interfaces in 5A-5X are used to illustrate the processes in FIGS. 6A-6E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or an "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
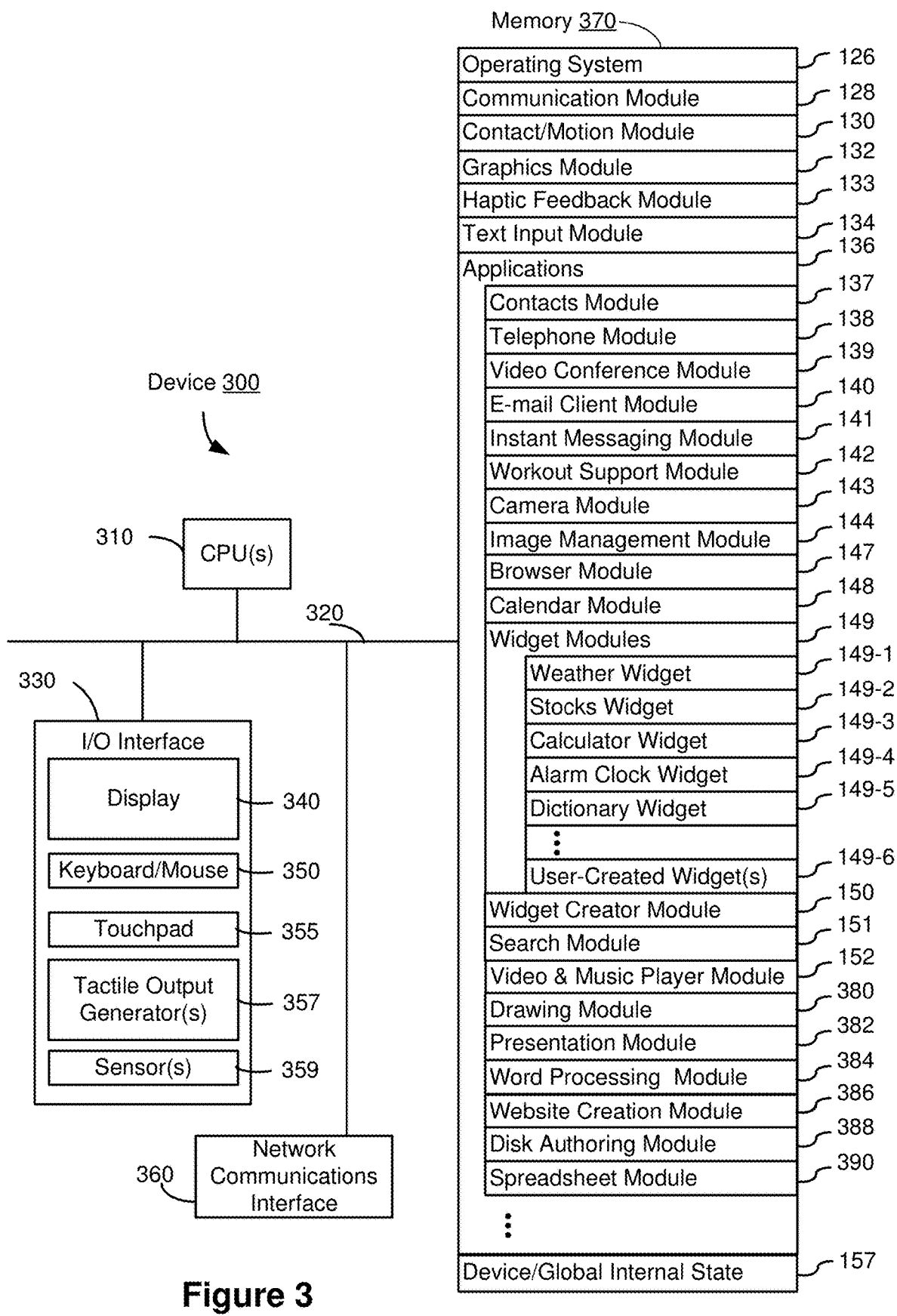
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conference module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail client 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, video conference module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
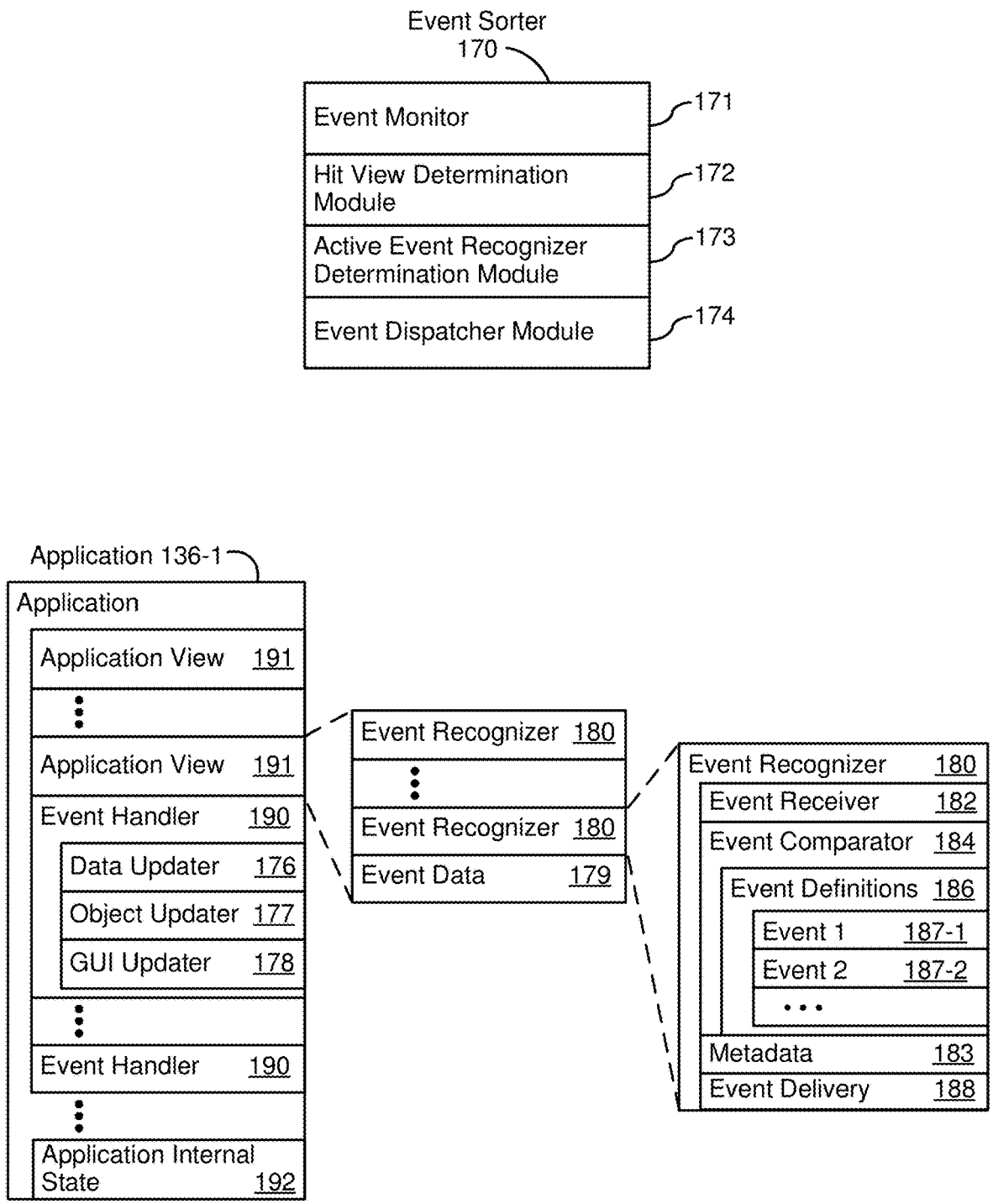
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
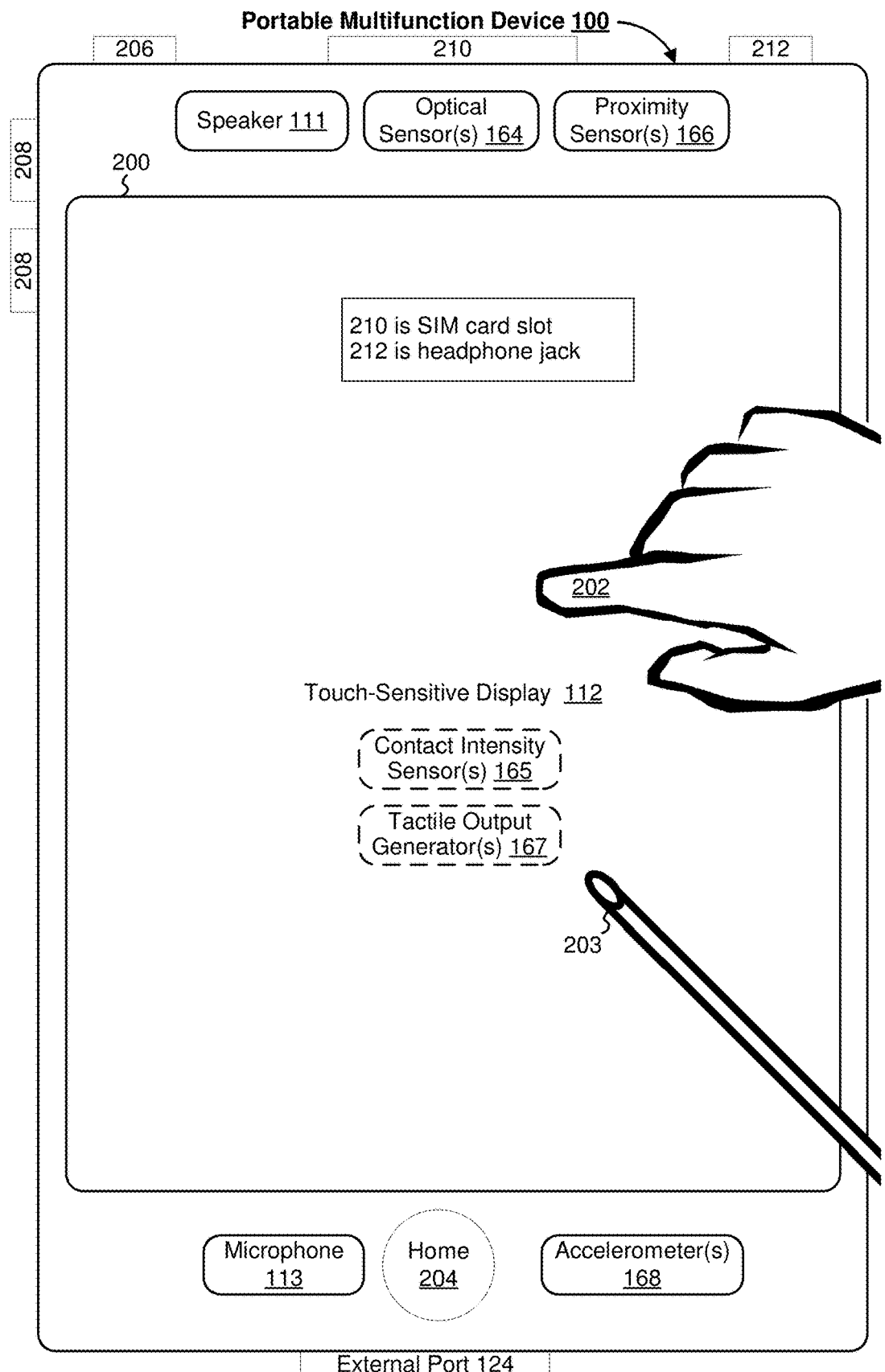
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed toward embodiments of user interfaces ("UI") that are, optionally, implemented on portable multifunction device 100.

Figure 4A:
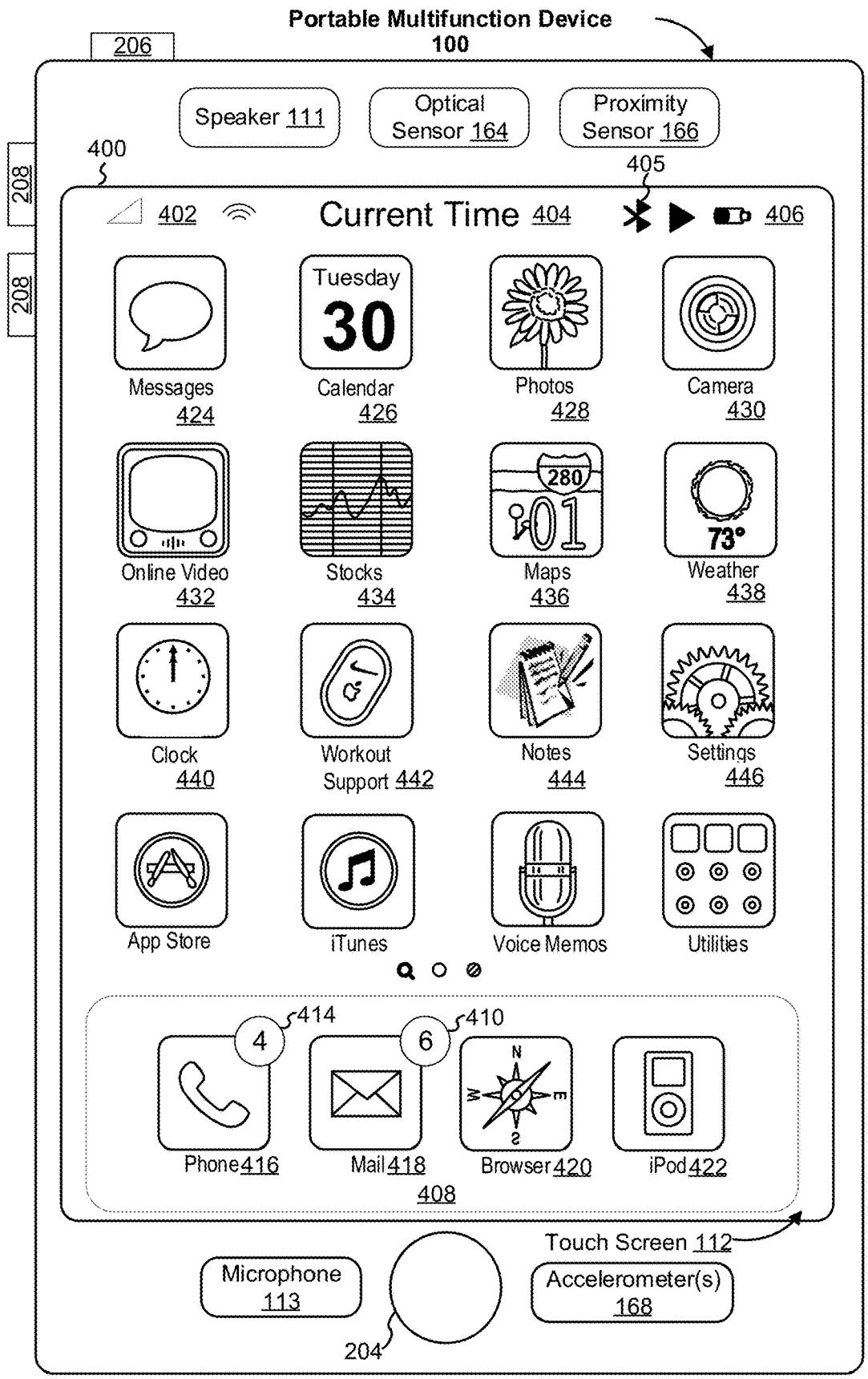
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
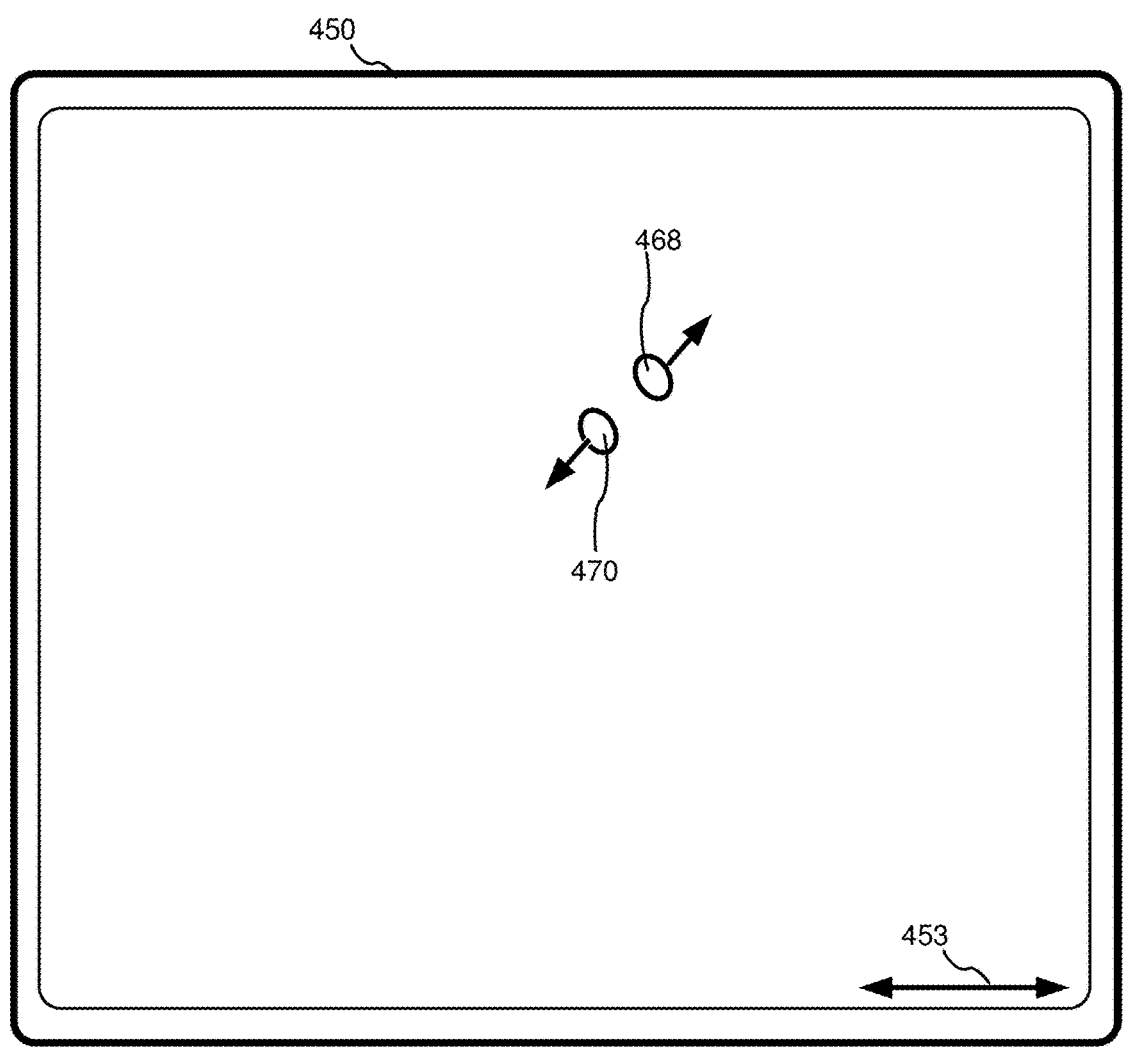
FIG. 4B illustrates an example user interface for a multifunction device with a touch-sensitive surface that is separate from the display in accordance with some embodiments.
Figure 4B:
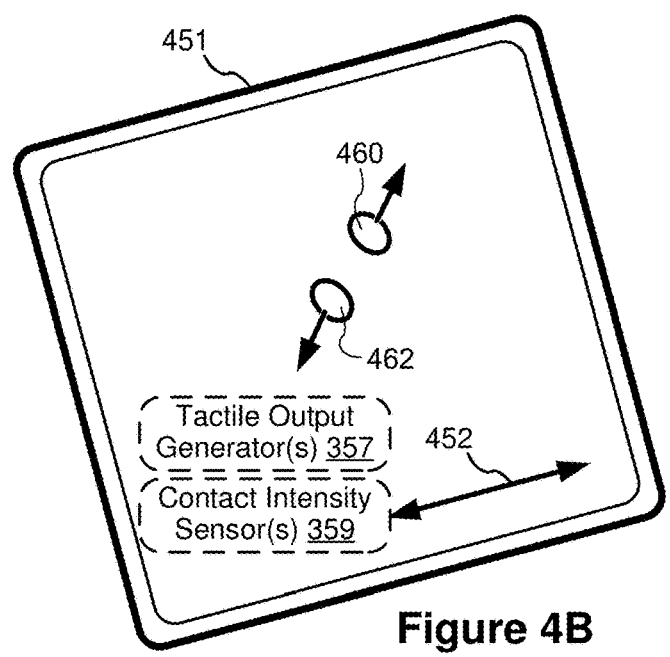

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined threshold values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed toward embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figure 5D:
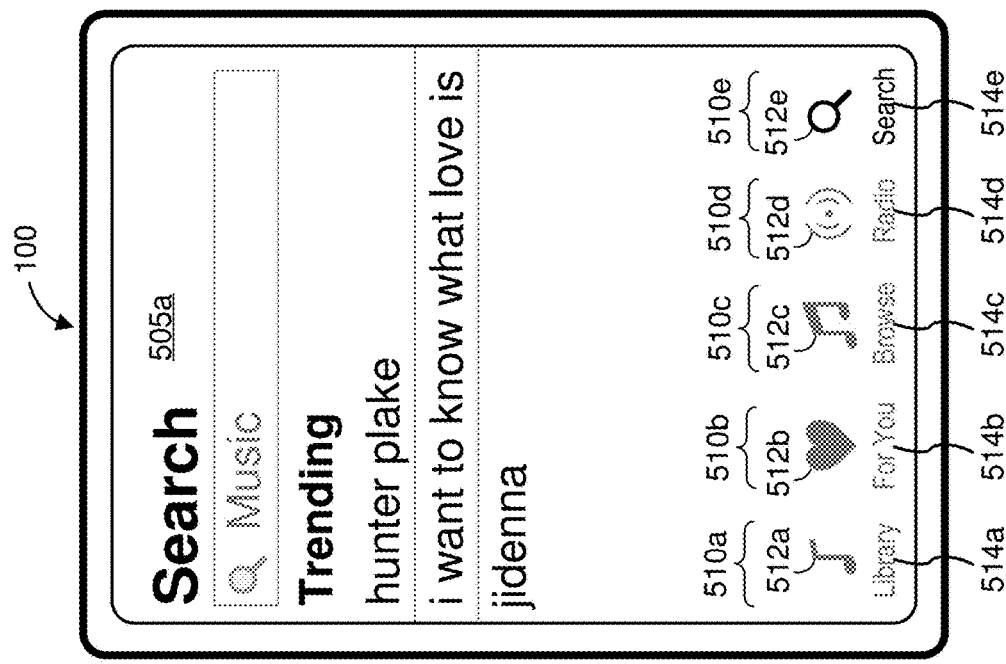
FIGS. 5A-5X illustrate example user interfaces for displaying affordances in accordance with some embodiments.
Figure 5C:
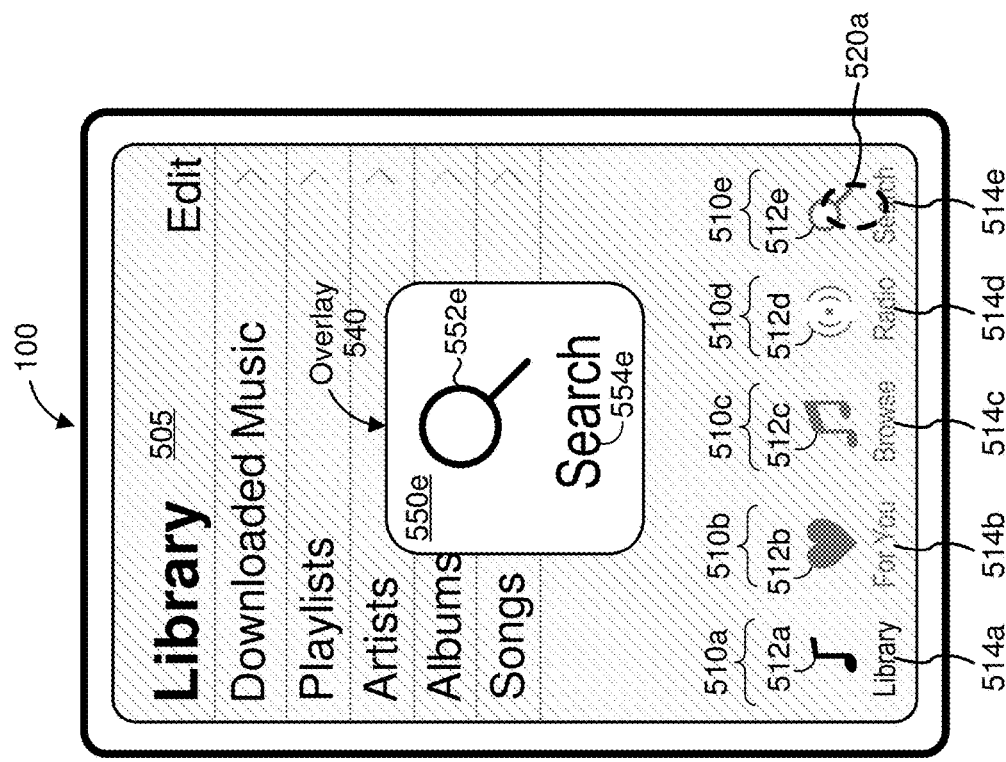
Figure 5F:
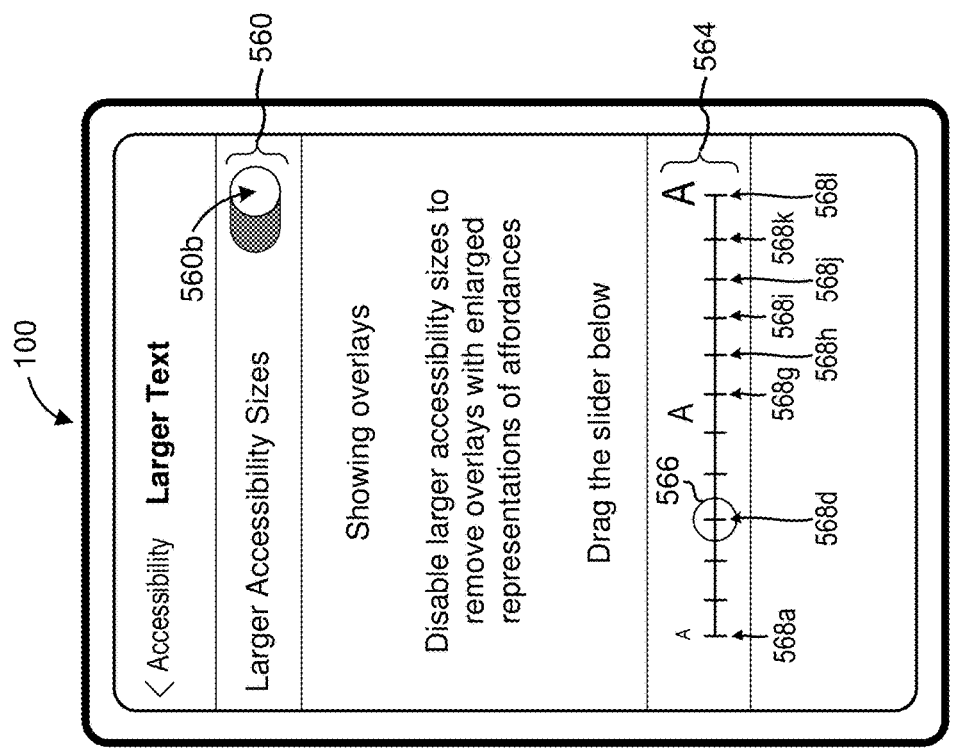
Figure 5E:
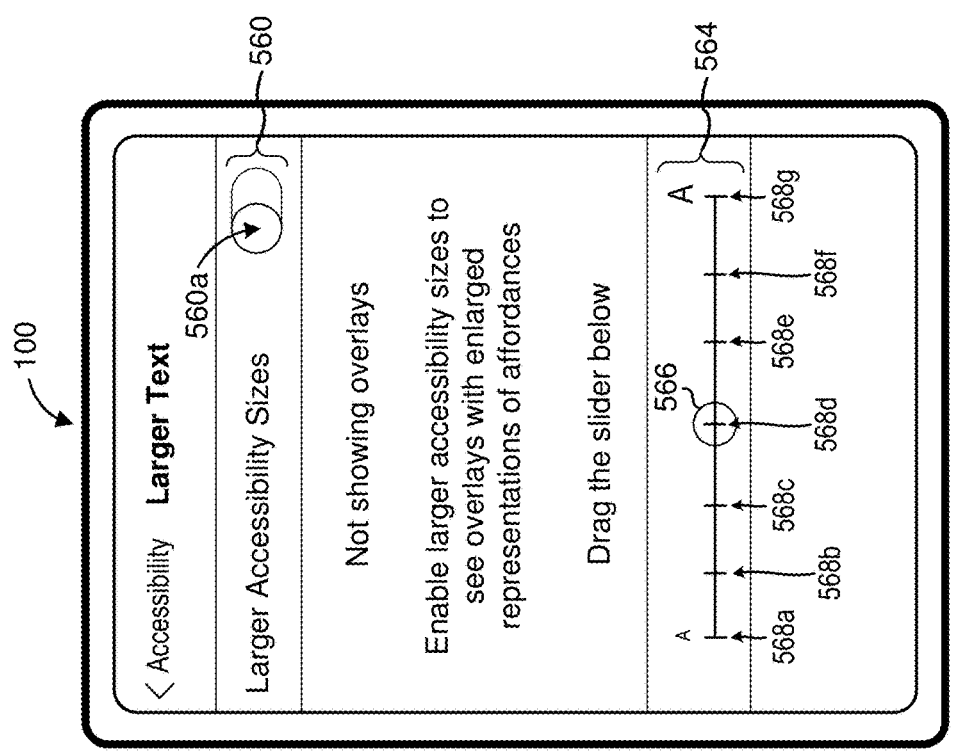
Figure 5H:
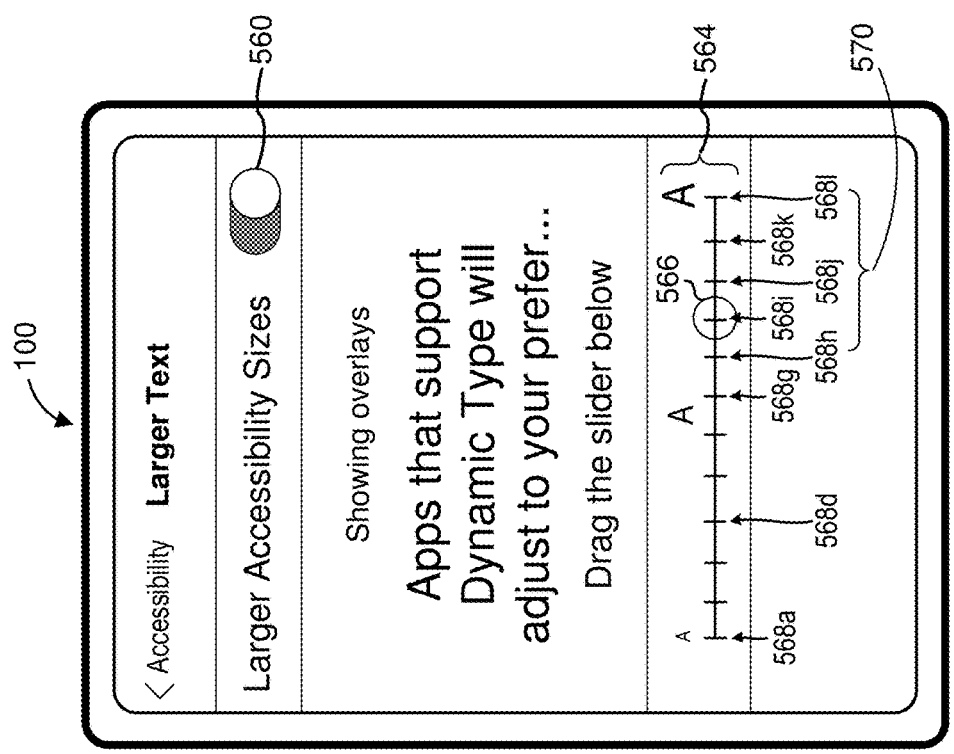
Figure 5G:
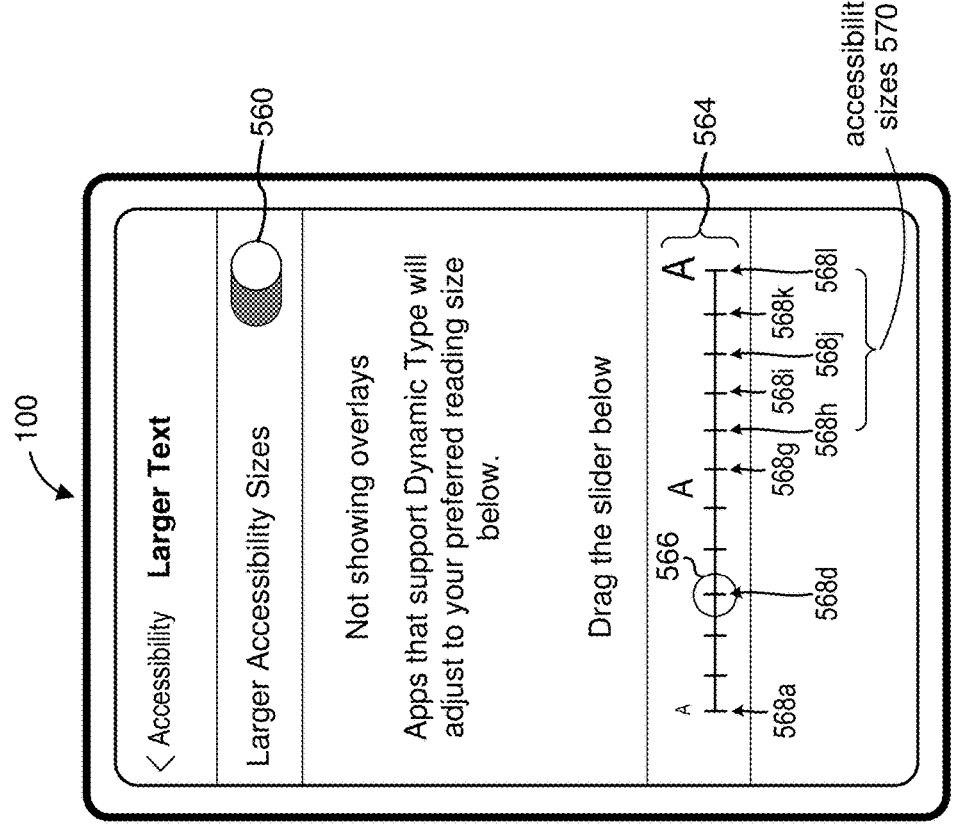
Figure 5J:
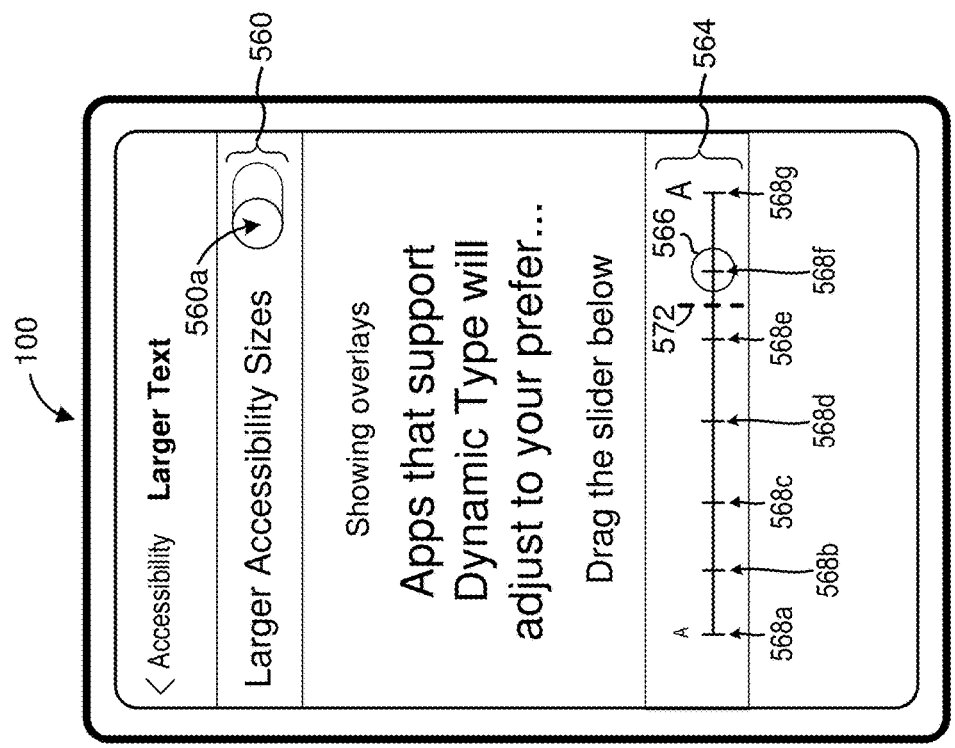
Figure 5I:
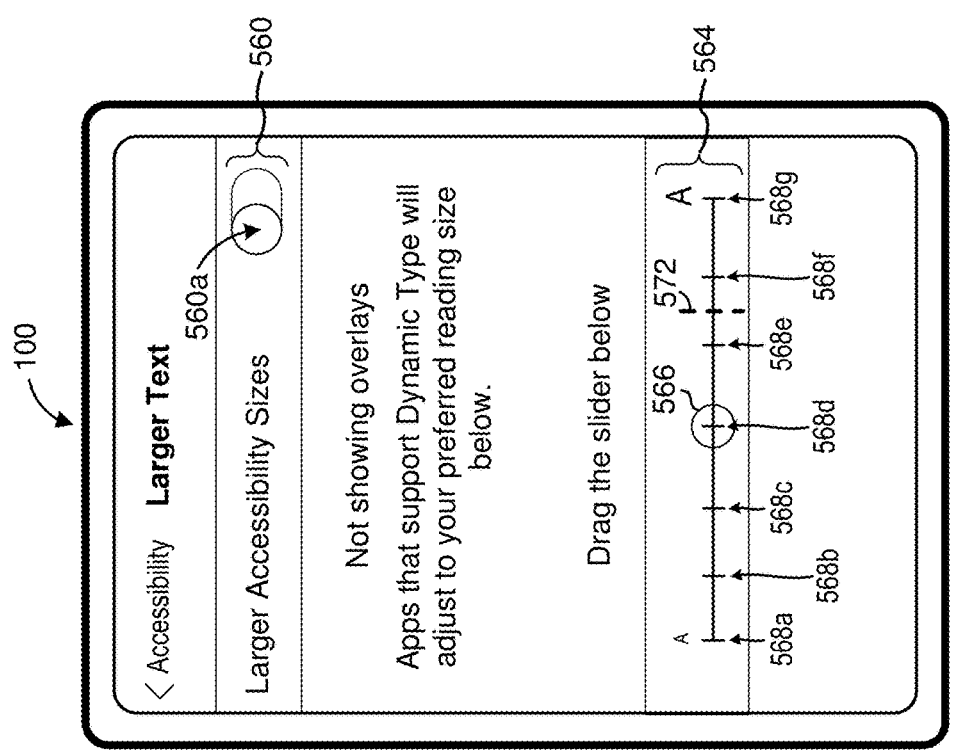
Figure 5L:
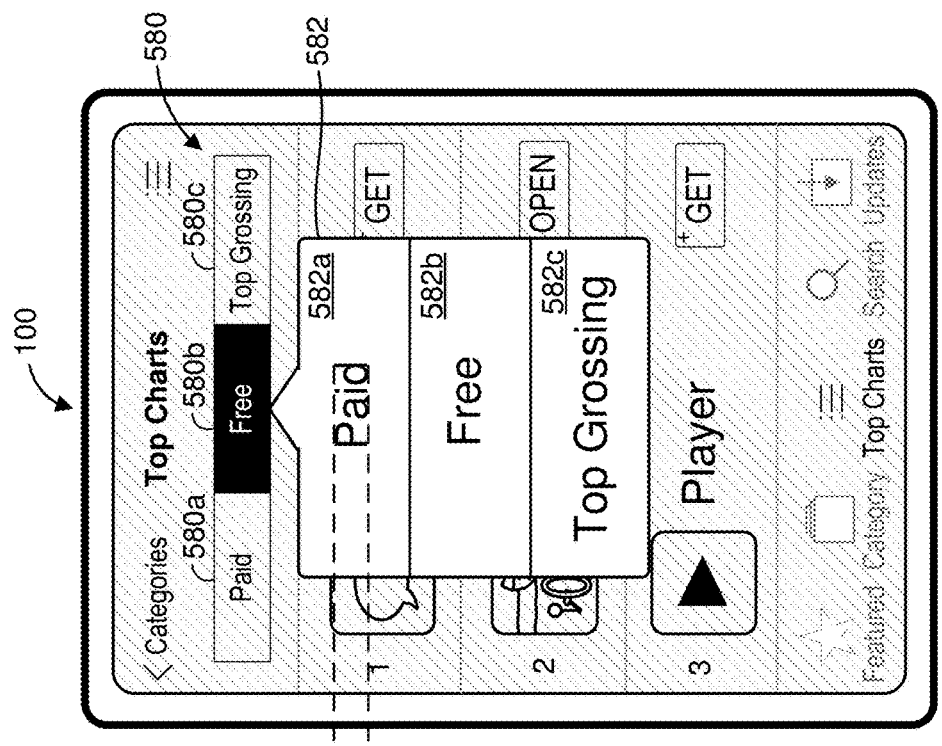
Figure 5K:
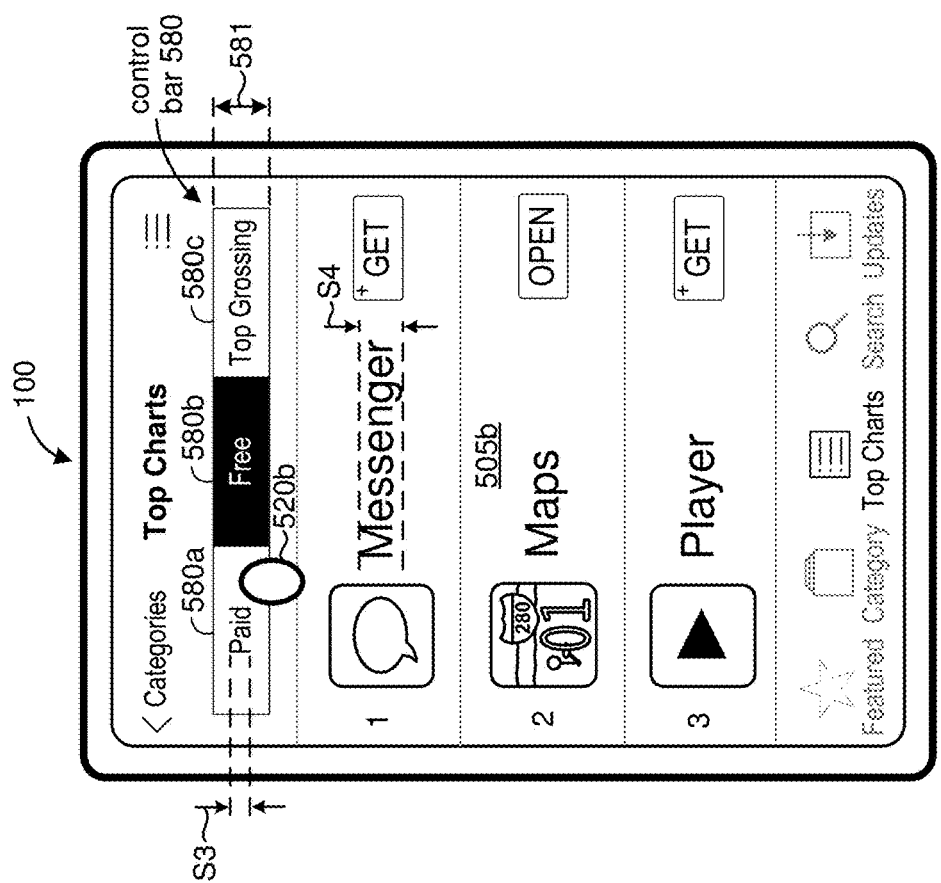
Figure 5N:
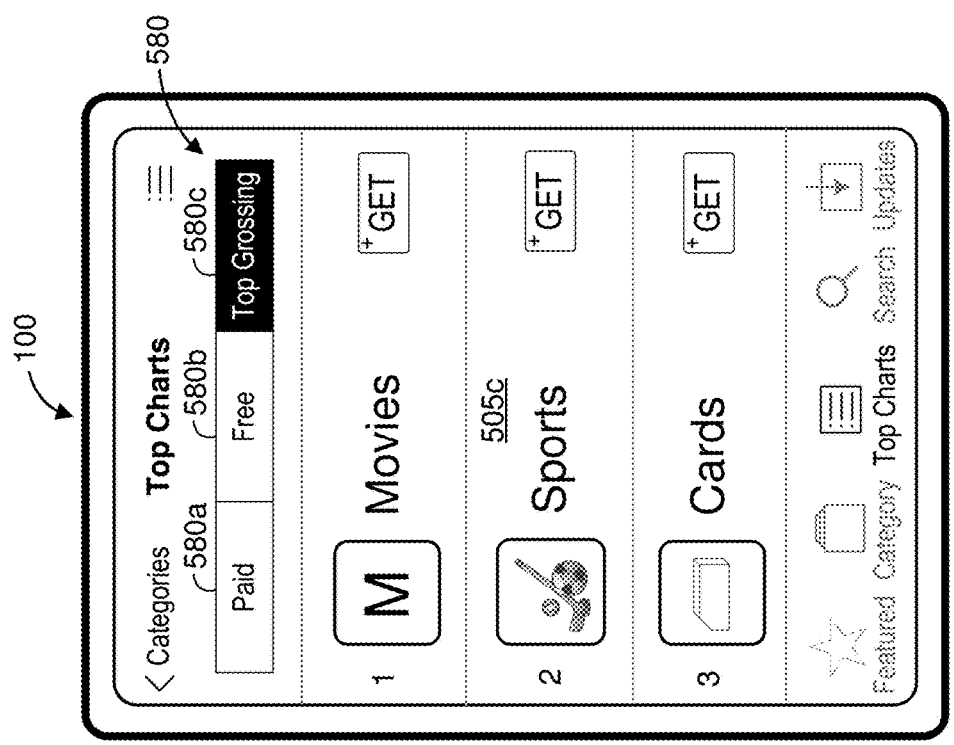
Figure 5M:
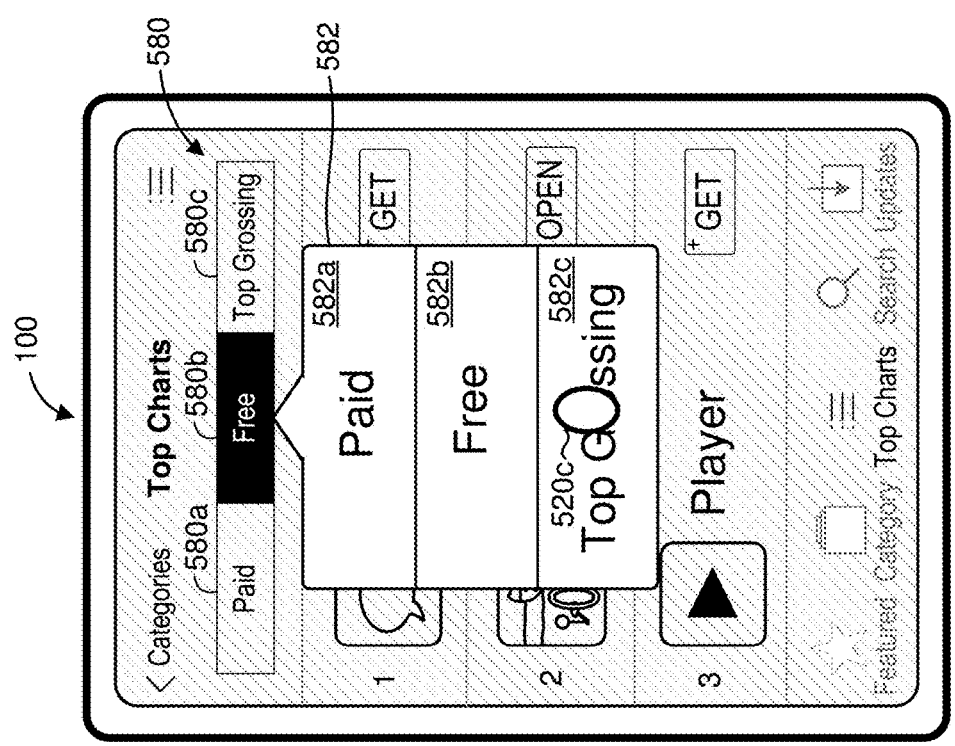
Figure 5O:
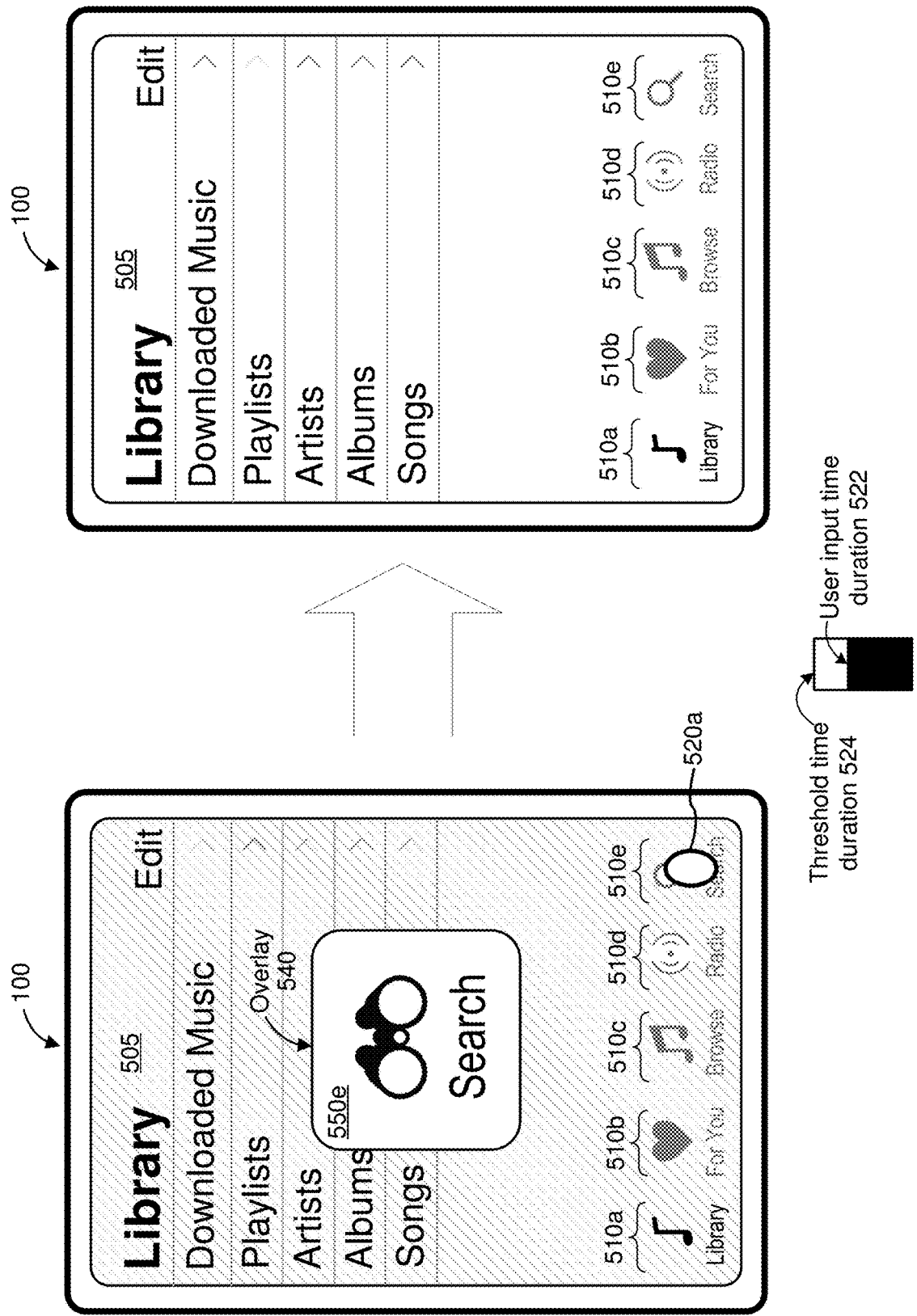
Figure 5P:
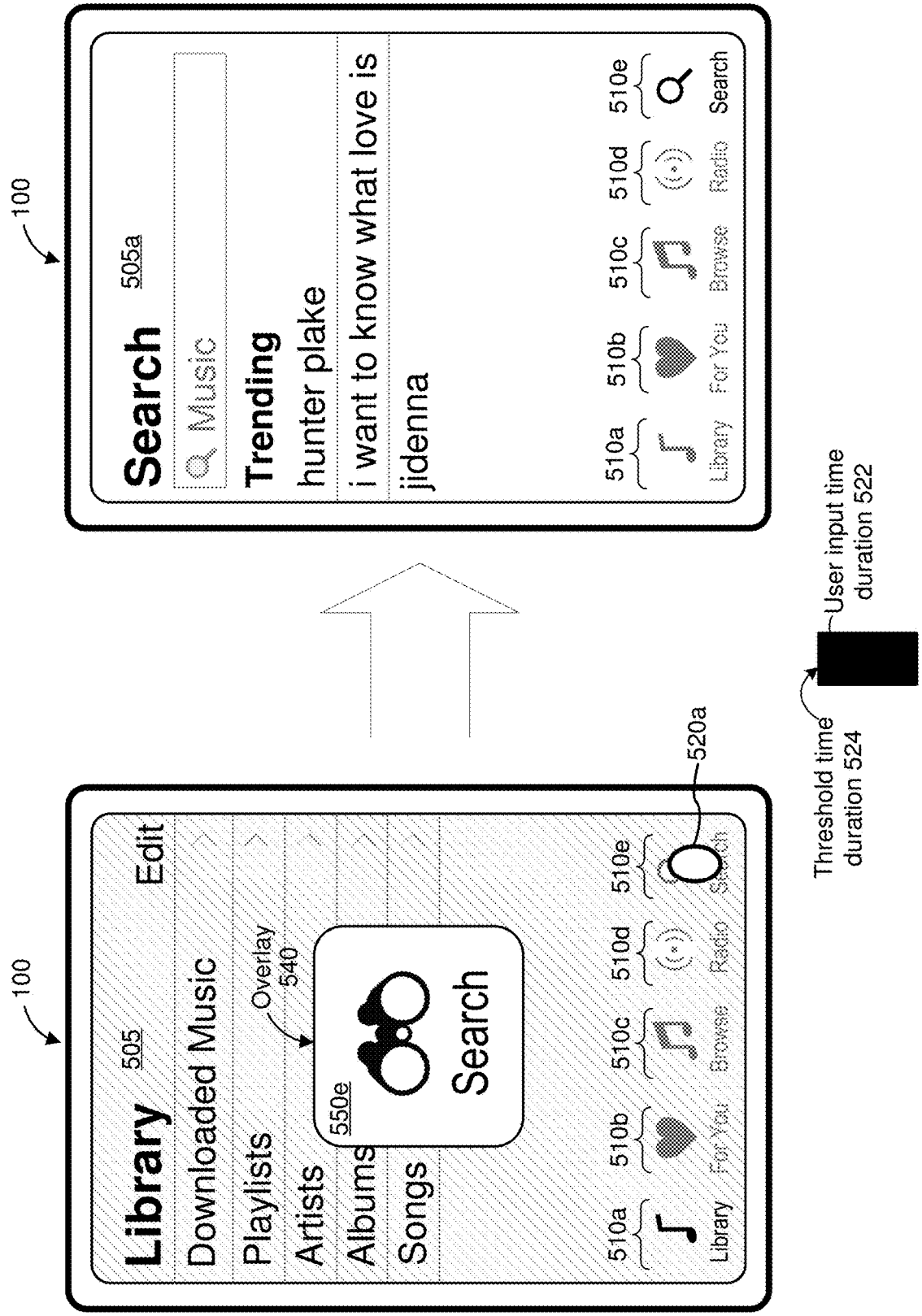
Figure 5Q:
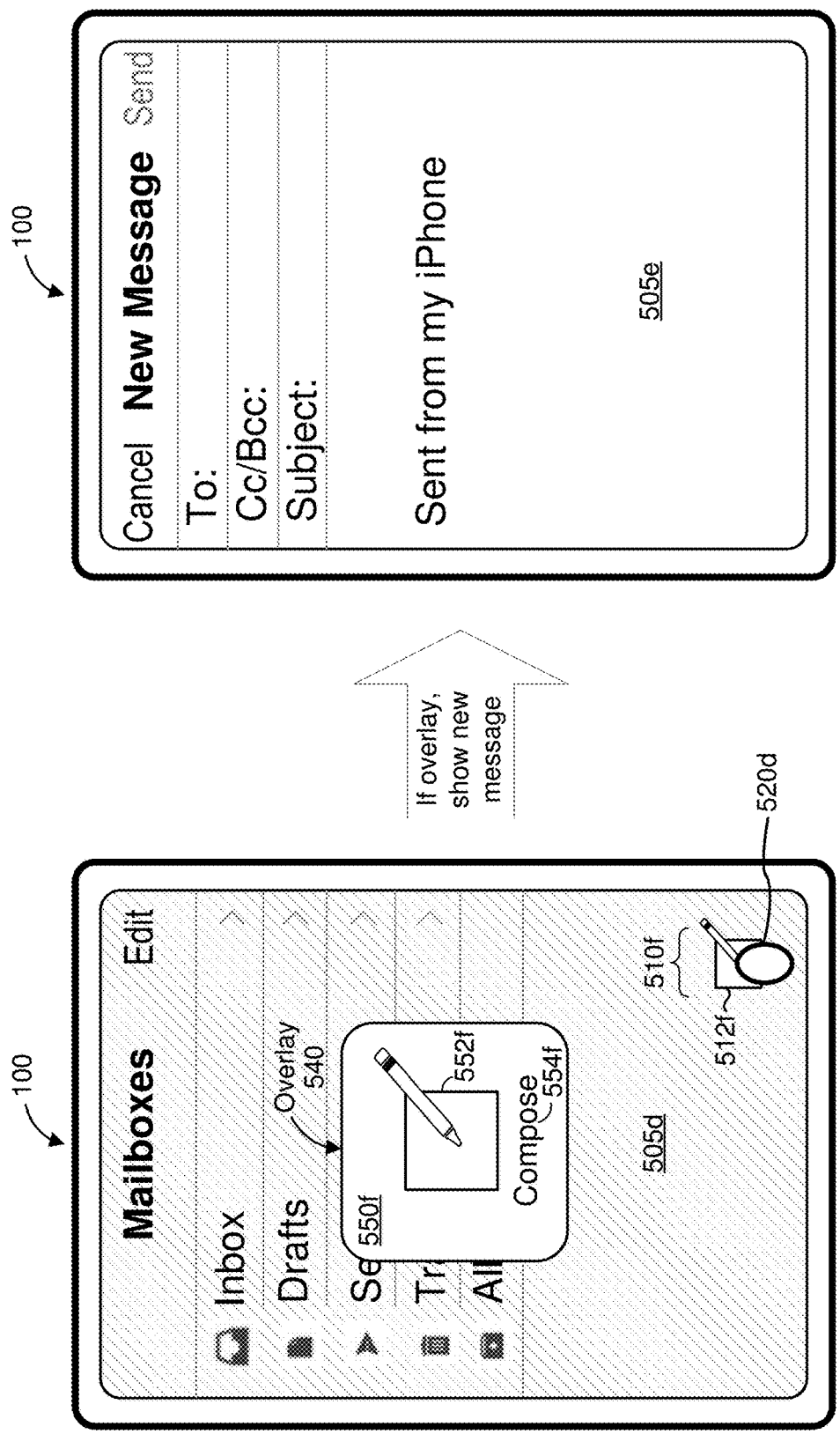
Figure 5R:
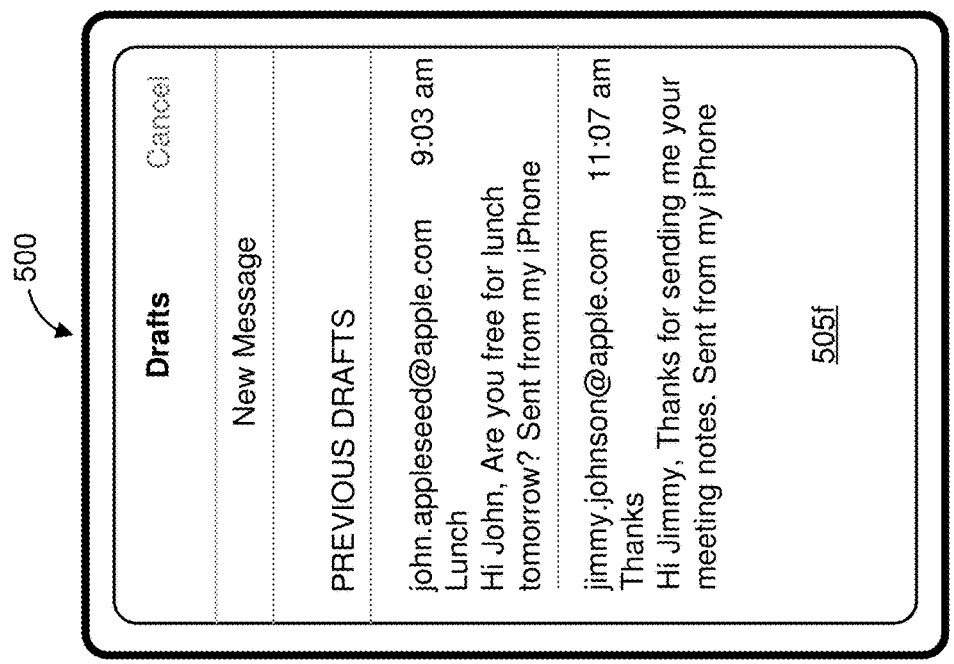
Figure 5R:
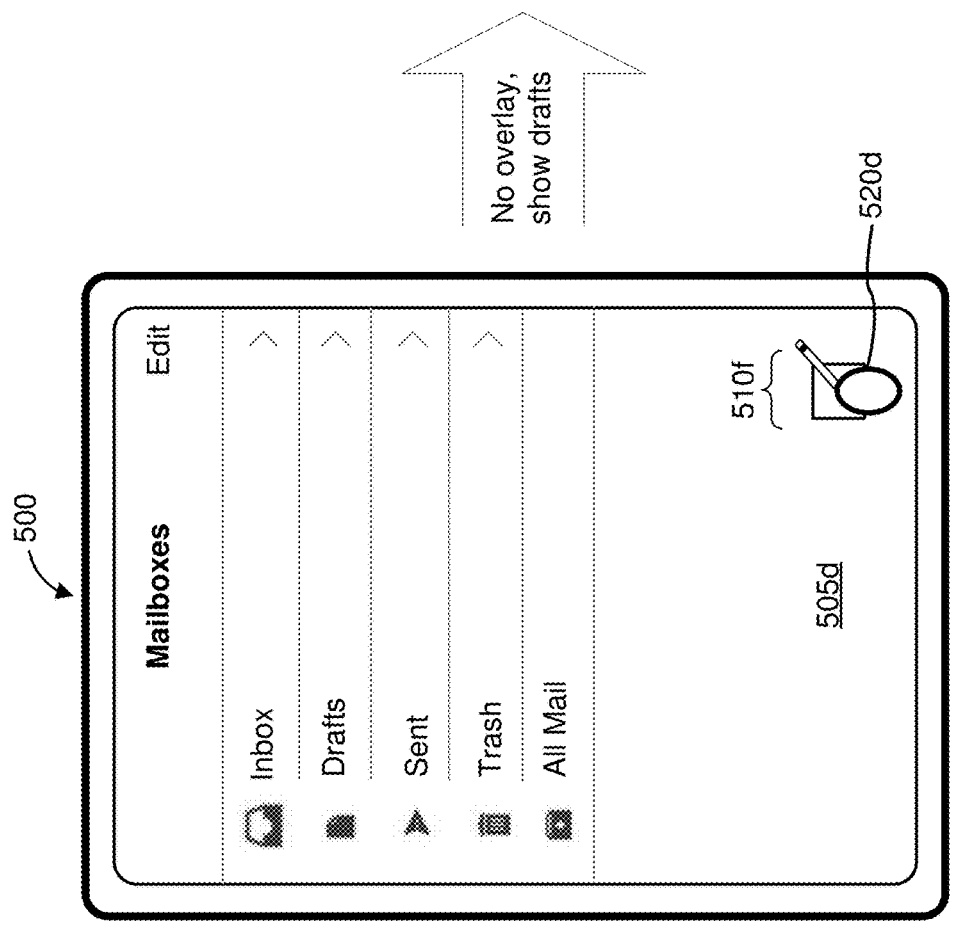
Figure 5T:
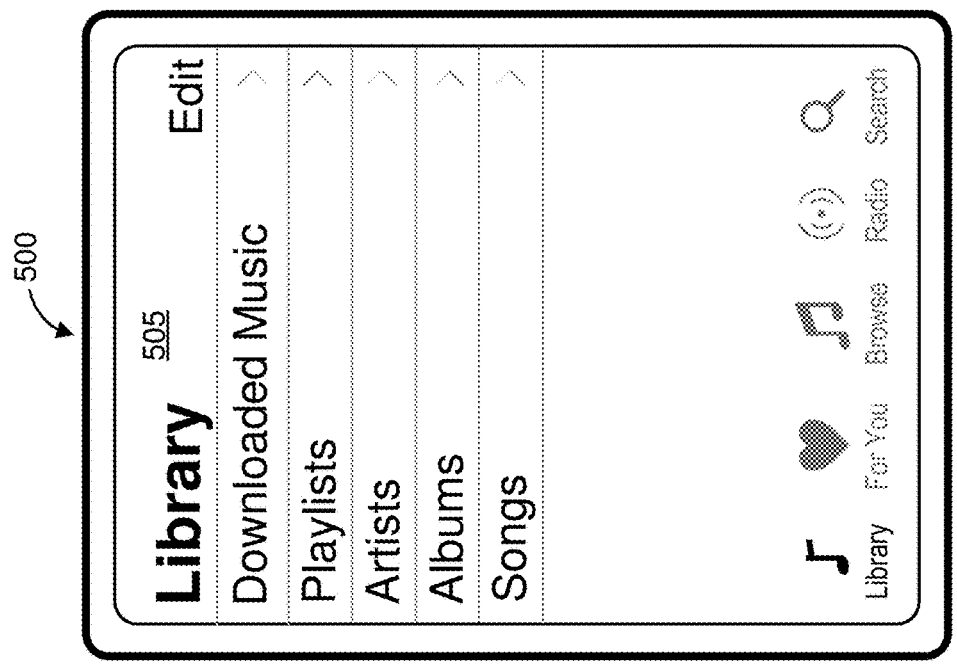
Figure 5S:
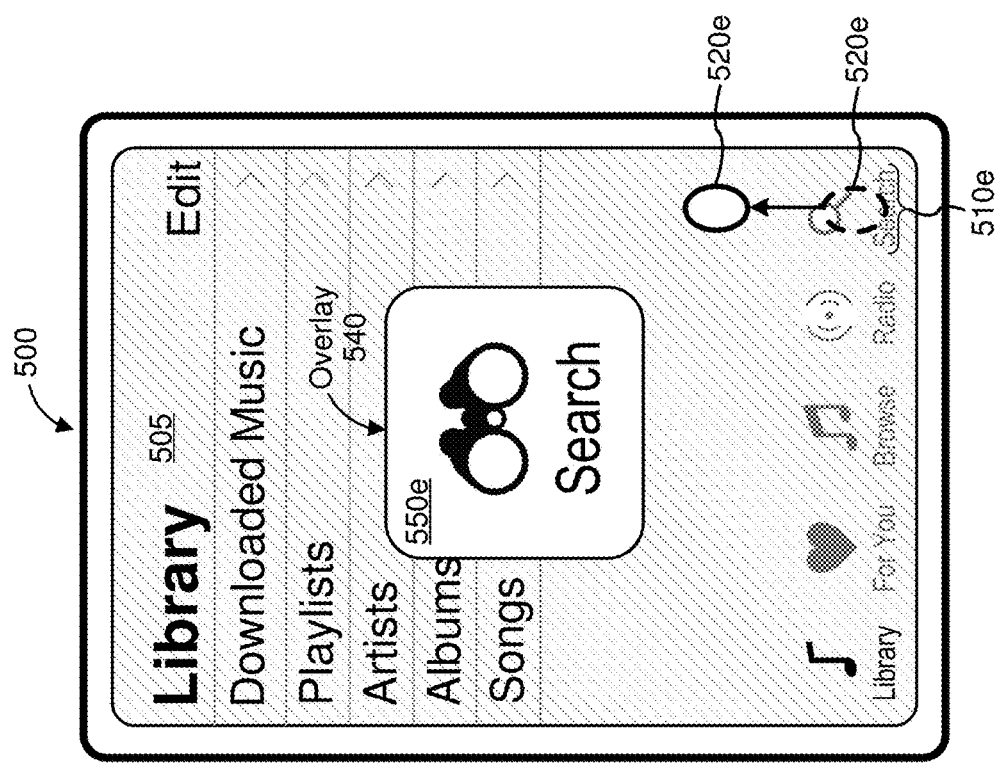
Figure 5V:
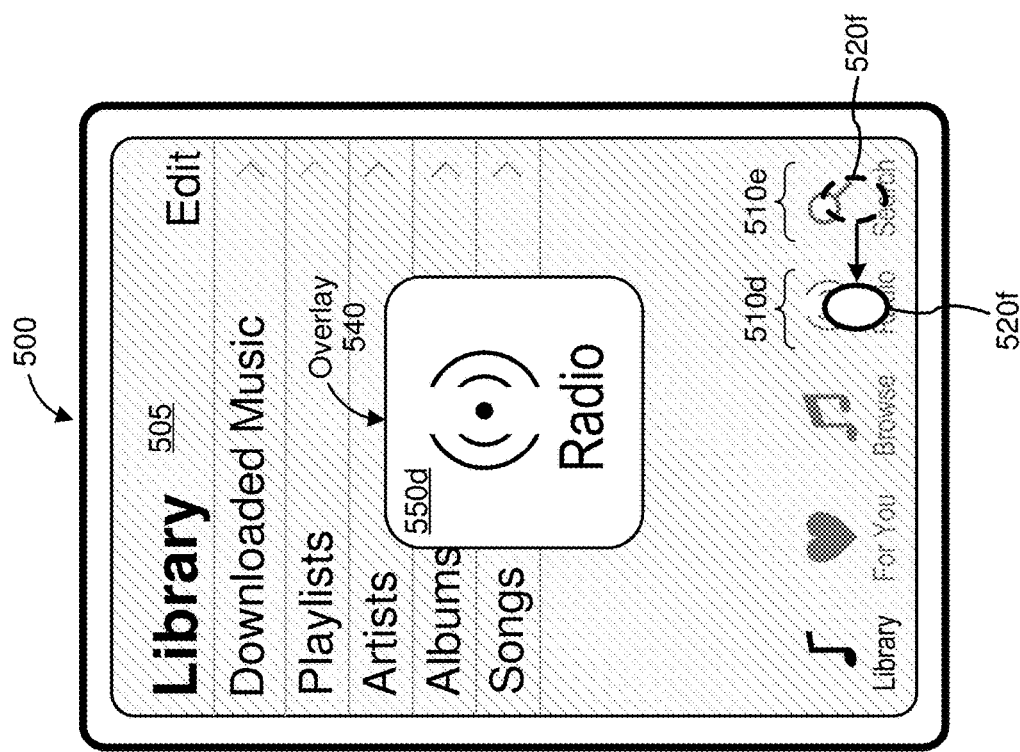
Figure 5U:
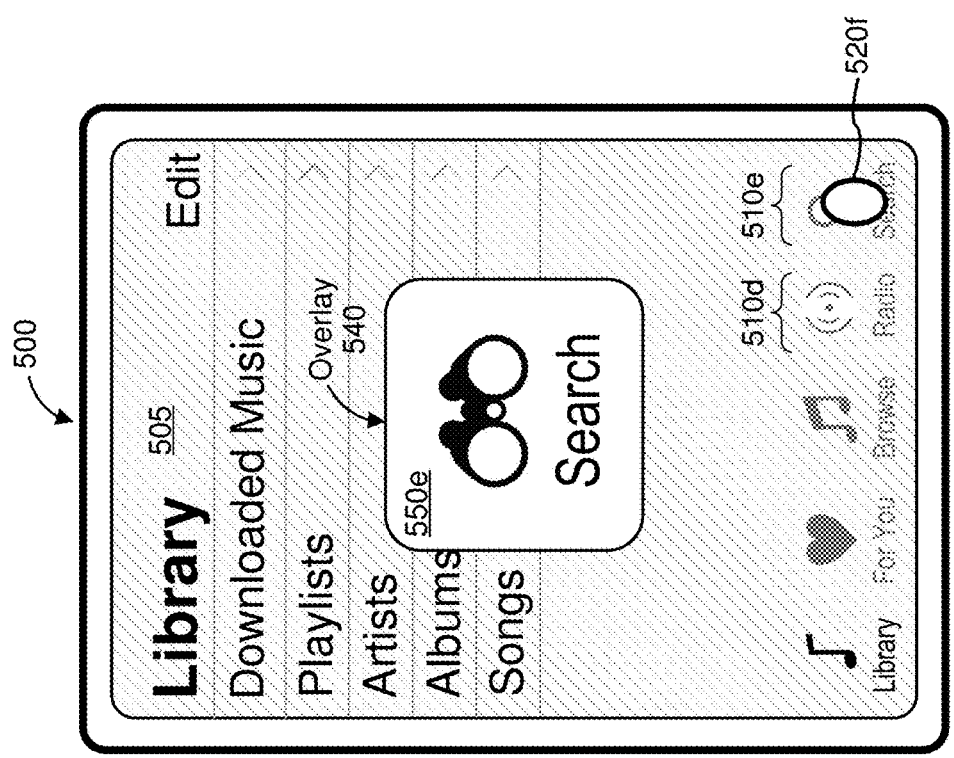
Figure 5X:
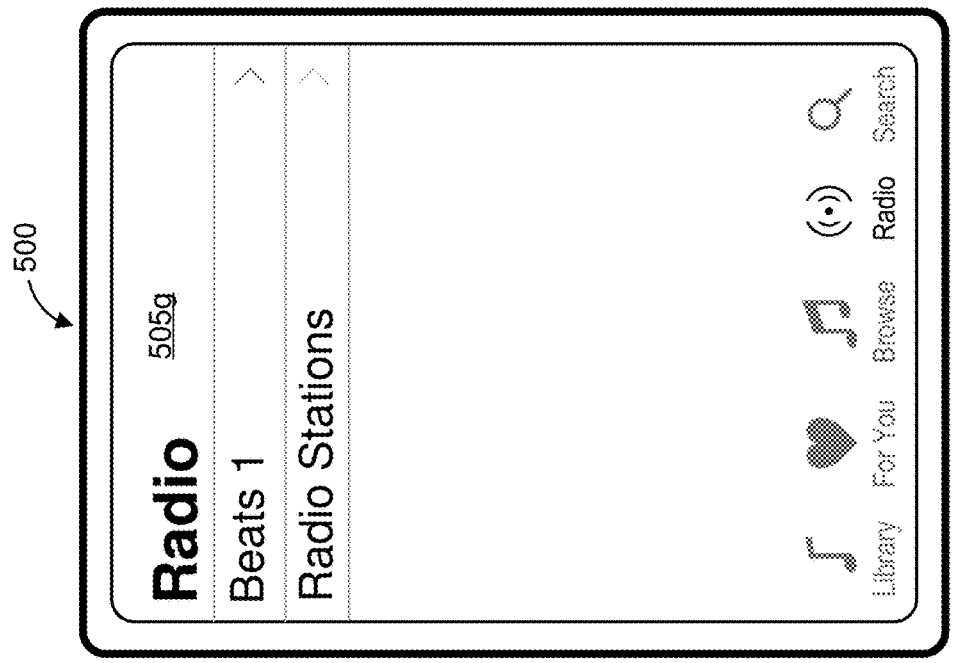

FIGS. 5A-5X illustrate example user interfaces for displaying enlarged representations of affordances in accordance with some embodiments. The user interfaces in these figures are used to illustrate the processes described below, including the processes in FIGS. 6A-6E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 5A-5D illustrate a sequence in which the device 100 displays an enlarged representation of an affordance in order to improve the visibility of the affordance. In FIG. 5A, the device 100 displays a user interface 505 that includes various affordances (e.g., affordances 510a, 510b, 510c, 510d and 510e). In the example of FIG. 5A, the user interface 505 is generated by a music application (e.g., the video and music player module 152 shown in FIG. 1A). In some embodiments, an affordance displayed within the user interface 505 is selectable to perform a respective operation associated with the affordance. For example, when the device 100 receives a user input selecting the affordance 510a, the device displays a media library (e.g., a music library). In some embodiments, an affordance includes a symbol (e.g., an image) and/or a text string. In the example of FIG. 5A, the affordances 510a, 510b, 510c, 510d and 510e include respective symbols 512a, 512b, 512c, 512d and 512e and respective text strings 514a, 514b, 514c, 514d and 514e.

As illustrated in FIG. 5A, an affordance (e.g., the affordances 510a, 510b . . . 510e) is displayed at an affordance size 516 on the display in the user interface 505. In some embodiments, the text of an affordance (e.g., the text strings 514a, 514b, 514c, 514d and 514e) is displayed at a text size S1. In some embodiments, text that is not included in an affordance is displayed at a text size S2 that is different from the text size S1. In the example of FIG. 5A, the text size S2 is greater than the text size S1. In some embodiments, the text size S2 is controlled by a text display setting (e.g., text size control 564 shown in FIGS. 5E-5J). For example, the user can adjust the text size S2 by changing a value of the text display setting. In some scenarios, the user can increase the text size S2 by increasing the value of the text display setting. In some embodiments, the affordance size 516 limits the text size S1. As such, in various embodiments, the text size S1 is smaller than the text size S2.

In FIG. 5B, the device 100 receives a user input 520a at a location that corresponds with the affordance 510e. For example, the user input 520a coincides with the symbol 512e and/or the text string 514e. In various embodiments, the user input 520a is different from a user input that triggers the operation associated with the affordance 510e. In some embodiments, the user input 520a is a hard press (e.g., a characteristic intensity of the user input 520a is greater than an intensity threshold) or a long press (e.g., a time duration associated with the user input 520a is greater than a threshold time duration), whereas the user input that triggers the operation associated with the affordance 510e is a tap input. In the example of FIG. 5B, the device 100 displays an overlay 540 in response to receiving the user input 520a. In some embodiments, the user input 520a is a request to display an enlarged representation of the affordance 510e. As such, the overlay 540 includes an enlarged representation 550e of the affordance 510e. In the example of FIG. 5B, the device 100 displays the overlay 540 in the center of the display. However, in some embodiments, the device 100 displays the overlay 540 at another location. For example, in some embodiments, the device 100 displays the overlay 540 adjacent to the location where the device 100 detected the user input 520a.

As illustrated in FIG. 5B, the enlarged representation 550e is displayed at an enlarged representation size 556 that is greater than the affordance size 516. In some embodiments, the enlarged representation 550e includes a symbol 552e (e.g., an image) and a text string 554e. In the example of FIG. 5B, the symbol 552e is an enlarged version of the symbol 512e, and the text string 554e is an enlarged version of the text string 514e. As such, in the example of FIG. 5B, the shape of the symbol 552e is the same as the shape of the symbol 512e. However, in some embodiments, the shape of the symbol 552e is different from the shape of the symbol 512e. Moreover, in the example of FIG. 5B, the text string 554e includes the same characters as the text string 514e. However, in some embodiments, the text string 554e includes different characters from the characters in the text string 514e. Displaying the enlarged representation 550e of the affordance 510e at the enlarged representation size 556 improves the visibility of the affordance 510e. Improving the visibility of the affordance 510e also improves the operability of the device 100 by reducing erroneous user inputs caused by poor visibility of affordances. Providing improved visibility of the affordances and reducing the number of erroneous user inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 5C-5D illustrate that when the device 100 detects that the user input 520a is withdrawn (e.g., lifted off, for example, when the device 100 detects that the user has lifted off a digit of the user), the device 100 performs an operation associated with the affordance 510e. In the example of FIG. 5D, the operation associated with the affordance 510e is displaying a search page 505a. As such, when the device 100 detects liftoff of a contact from a location corresponding to the affordance 510e, the device 100 displays the search page 505a. As illustrated in FIG. 5D, the search page 505a enables the user to perform a search. In some examples, the perceived visibility of the affordance 510e is poor, for example, if the user is visually impaired. In such examples, the user can provide the user input 520a (e.g., by pressing-and-holding the affordance 510e) to view the overlay 540. Since the overlay 540 includes the enlarged representation 550e of the affordance 510e, the overlay 540 provides the user with an improved visibility of the affordance 510e. In the example of FIGS. 5C-5D, if the user is certain about performing a search then the user can withdraw the user input 520a (e.g., by lifting off the digit of the user from the affordance 510e) in order to trigger the display of the search page 505a. As such, the overlay 540 improves the operability of the device 100 by enabling the user to operate the device 100 in a more predictable manner. Displaying the overlay 540 enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 5E-5J illustrate that the device 100 displays an enlarged representation of an affordance based on a function of a value of a text display setting. In the example of FIG. 5E, the text display setting includes an accessibility size control 560 and/or a text size control 564. In some embodiments, the text size control 564 controls a text size of various text strings. In some embodiments, the text size control 564 controls the text size of text strings that cannot be edited by the user. In some embodiments, the text size control 564 includes a slider 566 that the user can slide to one of a number of positions 568a, 568b . . . 568g that correspond to respective values for the text size control 564. In some embodiments, the accessibility size control 560 controls the number of available positions for the text size control 564. In some embodiments, the accessibility size control 560 is a toggle switch that can have one of two positions: an OFF position 560a, and an ON position 560b. As illustrated in FIGS. 5E-5F, when the accessibility size control 560 is switched from the OFF position 560a to the ON position 560b, the number of available positions for the text size control 564 increases. In FIG. 5F, in addition to the positions 568a . . . 568g, the text size control 564 also includes positions 568h . . . 568l. As such, toggling the accessibility size control 560 to the ON position 560b allows the user to select larger text sizes.

In some embodiments, the device 100 displays an overlay with an enlarged representation of an affordance (e.g., the overlay 540 shown in FIG. 5B) based on the position of the accessibility size control 560. In some embodiments, the device 100 displays the overlay based on a function of a value of the accessibility size control 560. In the example of FIGS. 5E-5F, the device 100 displays the overlay when the accessibility size control 560 is in the ON position 560b, and the device 100 forgoes the display of the overlay when the accessibility size control 560 is in the OFF position 560a. If the user toggles the accessibility size control 560 from the OFF position 560a to the ON position 560b, then the user is likely having trouble viewing text displayed by the device 100. Moreover, the perceived visibility of the affordances is likely poor. As such, displaying the overlay when the user toggles the accessibility size control 560 from the OFF position 560a to the ON position 560b will improve the visibility of the affordances for the user. Displaying the overlay when the user toggles the accessibility size control 560 from the OFF position 560a to the ON position 560b improves the visibility of affordances, enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Referring to FIGS. 5G-5H, in some embodiments, toggling the accessibility size control 560 from the OFF position 560a to the ON position 560b is not sufficient to trigger the overlays. As illustrated in FIGS. 5E-5F, toggling the accessibility size control 560 to the ON position 560b allows the user to slide the slider 566 to one of positions 568h, 568i . . . 568l. As illustrated in FIGS. 5G-5H, the text sizes corresponding with the positions 568h, 568i . . . 568l are referred to as accessibility sizes 570. As illustrated in FIG. 5H, the device 100 displays the overlay with the enlarged representation of an affordance when the slider 566 is set to one of the accessibility sizes 570. Moreover, as illustrated in FIG. 5G, the device 100 forgoes displaying the overlay when the slider 566 is not set to one of the accessibility sizes. As such, in the example of FIGS. 5G-5H, in addition to the accessibility size control 560 being in the ON position 560b, the slider 566 has to be set to one of the accessibility sizes 570 in order to trigger the display of overlays with enlarged representations of affordances. If the user slides the slider 566 to one of the accessibility sizes 570, the user is likely having trouble viewing text at current text sizes. The accessibility sizes 570 will generally make the text larger to improve the legibility of the text. However, the text in affordances is limited by the size of the affordances. As such, displaying overlays with enlarged representations of the affordances will improve the legibility of text that is limited by an affordance size because, within the overlay, the text size is not limited by the affordance size. Displaying an enlarged representation of text associated with an affordance improves the legibility of text associated with the affordance. Improving the legibility of text associated with affordances enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Referring to FIGS. 5I-5J, in some embodiments, the device 100 displays the overlay based on a value of the text size control 564. In the example of FIGS. 5I-5J, the device 100 displays the overlay when the text size control 564 has a value that is greater than a threshold 572 (e.g., a text size threshold), and the device forgoes displaying the overlay when the text size control 564 has a value that is less than the threshold 572. In the example of FIG. 5I, since the slider 566 is at position 568d, the text size control 564 has a value that is less than the threshold 572. As such, in the example of FIG. 5I, the device 100 will not display overlays with enlarged representations of affordances. In the example of FIG. 5J, since the slider 566 is at position 568f, the text size control 564 has a value that is greater than the threshold 572. As such, in the example of FIG. 5J, the device 100 will display overlays with enlarged representations of affordances. In the example of FIGS. 5I-5J, the device 100 can display overlays with enlarged representations of affordances even when the accessibility size control 560 is in the OFF position 560b. When the user increases the text size control 564 to a value that is greater than the threshold 572, the user is likely trying to improve the legibility of text because the user is having trouble reading the text. Displaying the overlays with enlarged representations of affordances when the text size control 564 has a value that is greater than the threshold 572 makes it easier for the user to see the affordances because the symbols and text of affordances are no longer limited by the affordance size. Making it easier for the user to see the affordances enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 5K-5N illustrate a sequence in which the device 100 displays an enlarged representation of a control bar 580 in order to improve the visibility of the control bar 580. In FIG. 5K, the device 100 displays a user interface 505b that includes the control bar 580. In the example of FIG. 5K, the user interface 505b is generated by an application that serves as an interface for an application store. In various embodiments, the control bar 580 includes two or more affordances. For example, in the example of FIG. 5K, the control bar 580 includes affordances 580a, 580b and 580c. Each of the affordances 580a, 580b and 580c is selectable to perform a respective operation associated with the affordance 580a, 580b and 580c. For example, when the device 100 receives a user input selecting the affordance 580a, the device displays paid applications that the user can purchase from the application store. In the example of FIGS. 5K-5N, the affordances 580a, 580b and 580c include text. However, in some embodiments, the affordances 580a, 580b and 580c include symbols in addition to, or instead of, text.

As illustrated in FIG. 5K, the control bar 580 is associated with a control bar size 581. In the example of FIG. 5K, the control bar size 581 indicates a height of the control bar 580. In some embodiments, the text in the control bar 580 (e.g., the text in the affordances 580a, 580b and 580c) is displayed at a text size S3. In the example of FIG. 5K, at least some of the text that is outside the control bar 580 is displayed at a text size S4. In some embodiments, the text size S3 is limited by the control bar size 581. As such, the text size S3 is typically smaller than the text size S4. In some embodiments, the user can increase the text size S4 (e.g., by adjusting the slider 566 shown in FIGS. 5E-5J), but the user cannot increase the text size S3 to the same extent because the text size S3 is limited by the control bar size 581.

In FIG. 5K, the device 100 receives a user input 520b at a location that corresponds with the control bar 580. In the example of FIG. 5K, the device 100 receives the user input 520b at a location that corresponds with the affordance 580a. In various embodiments, the user input 520b is different from a user input that triggers the operation associated with the affordance 580a. In some embodiments, the user input 520b is a long press or a hard press, whereas the user input that triggers the operation associated with the affordance 580a is a tap input. In the example of FIG. 5L, the device 100 displays an overlay 582 in response to receiving the user input 520b. In some embodiments, the user input 520b is a request to display an enlarged representation of two or more affordances in the control bar 580. As such, the overlay 582 includes an enlarged representation 582a of the affordance 580a, an enlarged representation 582b of the affordance 580b, and an enlarged representation 582c of the affordance 580c. More generally, in various embodiments, the overlay 582 includes an enlarged representation of two or more affordances of the control bar 580. In the example of FIG. 5L, the device 100 displays the overlay 582 near the center of the display. However, in some embodiments, the device 100 displays the overlay 582 at another location. For example, in some embodiments, the device 100 displays the overlay 582 adjacent to the location where the device 100 detected the user input 520b. As illustrated in FIG. 5L, the text in the enlarged representations 582a, 582b and 582c is displayed at a text size S5 that is larger than the text size S3. As such, displaying the overlay 582 improves the visibility of the affordances 580a, 580b and 580c in the control bar 580. Improving the visibility of the control bar 580 makes it easier for the user to operate the device 100 thereby improving the operability of the device 100. Improving the visibility of the control bar 580 enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In FIG. 5M, the device 100 receives a user input 520c selecting the enlarged representation 582c of the affordance 580c. In some embodiments, the user input 520c is a tap input. In response to receiving the user input 520c, the device 100 performs an operation associated with the affordance 580c. For example, as illustrated in FIG. 5N, the device 100 displays a top grossing screen 505c that includes representations for some of the top grossing applications in the application store. In some embodiments, a first type of user input (e.g., a long press or a hard press) triggers the display of the overlay 582, whereas a second type of user input (e.g., a tap input) forgoes display of the overlay 582 and triggers an operation associated with the selected affordance. As such, before triggering an operation associated with an affordance, the user can view an enlarged representation of the affordance. Displaying enlarged representations of affordances likely reduces the number of erroneous inputs caused due to limited visibility of affordances. Displaying enlarged representations of the affordances enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 5O-5P illustrate the device 100 receiving the user input 520a at a location corresponding with the affordance 510e. In the example of FIGS. 5O-5P, the user input 520a corresponds with a request to display the overlay 540 with the enlarged representation 550e of the affordance 510e. As such, in response to receiving the user input 520a, the device 100 displays the overlay 540 with the enlarged representation 550e of the affordance 510e. In the example of FIGS. 5O-5P, the user input 520a is associated with a time duration 522. In some embodiments, the time duration 522 corresponds with an amount of time for which the user input 520a is maintained. In some embodiments, the time duration 522 corresponds with an amount of time for which the user presses-and-holds a digit at a location corresponding with the user input 520a.

In some embodiments, the device 100 performs an operation associated with the affordance 510e in response to the time duration 522 being greater than or equal to a threshold time duration 524. For example, as illustrated in FIG. 5P, the device 100 displays the search page 505a in response to the time duration 522 being equal to the threshold time duration 524. In some embodiments, the device 100 forgoes performing the operation associated with the affordance 510e in response to the time duration 522 being less than the threshold time duration 524. For example, as illustrated in FIG. 5O, the device 100 forgoes displaying the search page 505a in response to the time duration 522 being less than the threshold time duration 524. Delaying the performance of the operation until the user input 520a is maintained for the threshold time duration 524 provides the user with sufficient time to view the enlarged representation 550e of the affordance 510e. Providing the user with sufficient time to view the enlarged representation 550e of the affordance 510e improves the likelihood that the operation is performed if the user intended to perform the operation. Forgoing the performance of the operation when the user input 520a is not maintained for the threshold time duration 524 reduces the likelihood of performing unintended operations.

FIGS. 5Q-5R illustrate a user interface 505d generated by a mail application (e.g., the email client module 140 shown in FIG. 3). The user interface 505d includes an affordance 510f that the user can tap to view a new message screen 505e (shown in FIG. 5Q), or long press to view a previous drafts screen 505f (shown in FIG. 5R). In the example of FIGS. 5Q-5R, the affordance 510f includes an image 512f, but the affordance 510f does not include any text. In some embodiments, the affordance 510f is associated with two different operations. In such embodiments, a first type of user input (e.g., a tap input) at a location corresponding with the affordance 510f triggers a first operation, whereas a second type of user input (e.g., a long press) at the location corresponding with the affordance 510f triggers a second operation that is different from the first operation. In some examples, a tap of the affordance 510f triggers a new message screen 505e (shown in FIG. 5Q), whereas a long press of the affordance 510f triggers a previous drafts screen 505f (shown in FIG. 5R).

In some embodiments, the device 100 substitutes displaying the overlay 540 for one of the operations associated with the affordance 510f based on a value of a text display setting. In other words, the device 100 replaces one of the operations associated with the affordance 510f with displaying the overlay 540 based on a value of a text display setting. In some embodiments, the device 100 replaces one of the operations with the overlay 540 in response to a value of a text size control being greater than a threshold (e.g., in response to a value of the text size control 564 being greater than the threshold 572 shown in FIG. 5J). In some such embodiments, the first type of user input (e.g., the tap input) triggers the first operation (e.g., displaying the new message screen 505e) without displaying the overlay 540. Moreover, the second type of user input (e.g., the long press) triggers the display of the overlay 540. As illustrated in FIG. 5Q, if the second type of user input (e.g., the long press, for example, the user input 520d) is maintained for a threshold amount of time (e.g., the threshold time duration 524 shown in FIG. 5P), then the device 100 performs the first operation (e.g., displaying the new message screen 505e) after displaying the overlay 540.

In some examples, one of the operations associated with the affordance 510e (e.g., the operation associated with the long press, for example, displaying the previous drafts screen 505f) is considered an expert operation that many users are likely unaware of. Replacing the expert operation with displaying the overlay 540 improves the operability of the device 100 by improving the visibility of the affordance 510e. Moreover, since the operation being replaced is an expert operation, it is unlikely that the user will notice the absence of the expert operation.

In the example of FIG. 5Q, the enlarged representation 550f of the affordance 510f includes a text string 554f, whereas the affordance 510f does not include any text. In some embodiments, the device 100 utilizes an application programming interface (API) (e.g., an accessibility API) to retrieve the text string 554f. In some scenarios, the user does not know what the image 552f represents. As such, the user cannot understand what the affordance 510f does by viewing just the image 552f in the overlay 540. In such scenarios, the text string 554f serves as a descriptor that indicates what the affordance 510e does. In the example of FIG. 5Q, the text string 554f indicates that the affordance 510e is for composing a new message. Displaying the text string 554f in the overlay 540, when the affordance 510f does not include any text, prevents erroneous user inputs by reducing the need to activate the affordance 510f in order to discover the operation associated with the affordance 510f. Reducing the need to activate the affordance 510f enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 5S-5T illustrate a sequence in which the user slides a user input 520e from a location that corresponds with the affordance 510e to a location that does not correspond with the affordance 510e. In other words, in the example of FIG. 5S, the user slides the user input 520e off the affordance 510e. As illustrated in FIG. 5T, in response to the user sliding the user input 520e away from the affordance 510e, the device 100 ceases to display the overlay 540. In the example of FIG. 5T, the device 100 continues displaying the user interface 505 after the device 100 ceases to display the overlay 540. In some scenarios, the user decides not to activate the affordance 510e after viewing the enlarged representation 550e of the affordance 510e in the overlay 540. As such, maintaining the display of the user interface 505 instead of displaying the search page 505a (shown in FIG. 5D), makes the device 100 operate as the user intends thereby improving the user experience. Maintaining the display of the user interface 505 enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

FIGS. 5U-5V illustrate a sequence in which the user slides a user input 520f from a location that corresponds with the affordance 510e to a location that corresponds with the affordance 510d. In response to detection of movement of the user input 520f from the affordance 510e to the affordance 510d, the device 100 replaces the enlarged representation 550e of the affordance 510e with an enlarged representation 550d of the affordance 510d. In other words, the device 100 refreshes the overlay 540 to display the enlarged representation 550d of the affordance 510d when the user slides the user input 520f to the affordance 510d. As such, the device 100 refreshes the overlay 540 to display an enlarged representation of an affordance that the user has currently selected. Refreshing the overlay 540 allows the user to view enlarged representations of affordances while the user is sliding a digit of the user to discover the various affordances. Refreshing the overlay 540 reduces the number of erroneous user inputs and enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 5W:
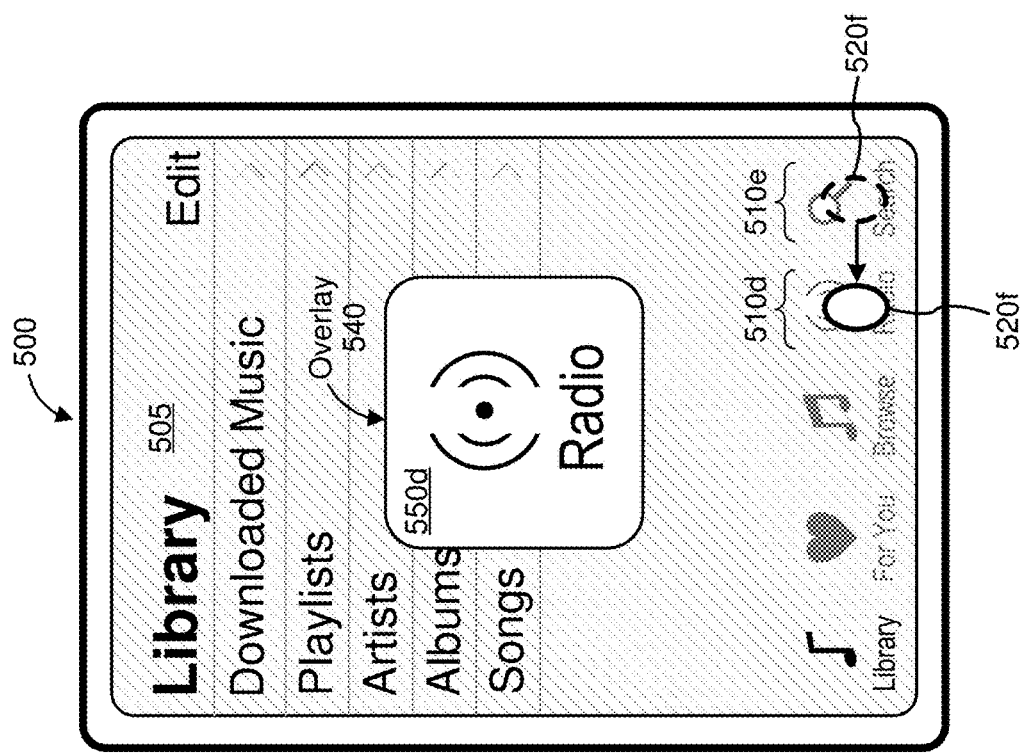

FIGS. 5W-5X illustrates a sequence in which the device detects movement of the user input 520f from the affordance 510e to the affordance 510d, and after moving, the user input 520f ceases to be detected by the device (e.g., the user input 520f is lifted off the affordance 510d). In some embodiments, detection of liftoff of the user input 520f from the affordance 510d corresponds with a request to perform an operation associated with the affordance 510d. In other words, detecting liftoff of the user input 520f from the affordance 510d corresponds with a request to activate the affordance 510d. As such, in response to detecting liftoff of the user input 520f, the device 100 displays a radio station screen 505g generated by the music application. Displaying the radio station screen 505g after the user input 520f is lifted off the affordance 510d allows the user to view the enlarged representation 550d of the affordance 510d before the radio station screen 505g is displayed. As such, displaying the radio station screen 505g after the user input 520f is lifted off enables the device 100 to operate as the user likely intends thereby improving the operability of the device 100.

FIGS. 6A-6E illustrate a flow diagram of a method 600 of displaying an overlay with an enlarged representation of an affordance in accordance with some embodiments. The method 600 is performed at an electronic device (e.g., the device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 600 are, optionally, combined and/or the order of some operations is, optionally, changed.

As described below, the method 600 provides an intuitive way to view an enlarged representation of an affordance. The method improves the visibility of an affordance by displaying an enlarged representation of the affordance in an overlay, thereby improving the operability of the device. For battery-operated electronic devices, improving the visibility of affordances reduces erroneous user inputs caused by limited visibility. Fewer erroneous user inputs reduce the amount of time that the display is powered on thereby conserving power and increasing the time between battery charges.

The device displays (602), on the display, a user interface of a first application (e.g., the user interface 505 shown in FIG. 5A). In some embodiments, the user interface includes a plurality of affordances including a first affordance (e.g., the affordances 510a, 510b . . . 510e shown in FIG. 5A). In various embodiments, the first affordance is selectable to perform a respective operation associated with the first affordance (e.g., the affordance 510e can be selected to display the search page 505a shown in FIG. 5D). In some embodiments, the first affordance is displayed at a first size on the display in the user interface of the first application (e.g., the affordance 510e is displayed at the affordance size 516 shown in FIG. 5A).

The device receives (604) a user input at a location that corresponds with the first affordance. For example, as shown in FIG. 5B, the device 100 receives the user input 520 at a location that corresponds with the affordance 510e.

In response to receiving the user input and in accordance with a determination that a text display setting has a first value (606), the device displays an overlay that includes an enlarged representation of the first affordance. For example, as shown in FIG. 5B, the device 100 displays the overlay 540 that includes the enlarged representation 550e of the affordance 510e. In the example of FIGS. 5E-5F, the device 100 displays the overlay when the accessibility size control 560 is in the ON position 560b. In the example of FIGS. 5G-5H, the device 100 displays the overlay when the text size control 564 is set to one of the accessibility sizes 570. In some embodiments, the enlarged representation of the first affordance has a second size that is bigger than the first size. In the example of FIG. 5B, the enlarged representation 550e has an enlarged representation size 556 that is bigger than the text size S1. Displaying the overlay with the enlarged representation of the affordance improves the visibility of the affordance thereby improving the operability of the device. Providing improved visibility of the affordances and reducing the number of erroneous user inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the user input and in accordance with a determination that the text display setting has a second value that is different from the first value (606), the device forgoes display of the enlarged representation of the first affordance. In the example of FIG. 5E, the device 100 forgoes display of the overlay when the accessibility size control 560 is in the OFF position 560*a*. In the example of FIG. 5G, the device 100 forgoes display of the overlay when the text size control 564 is not set to one of the accessibility sizes 570.

Figure 6B:
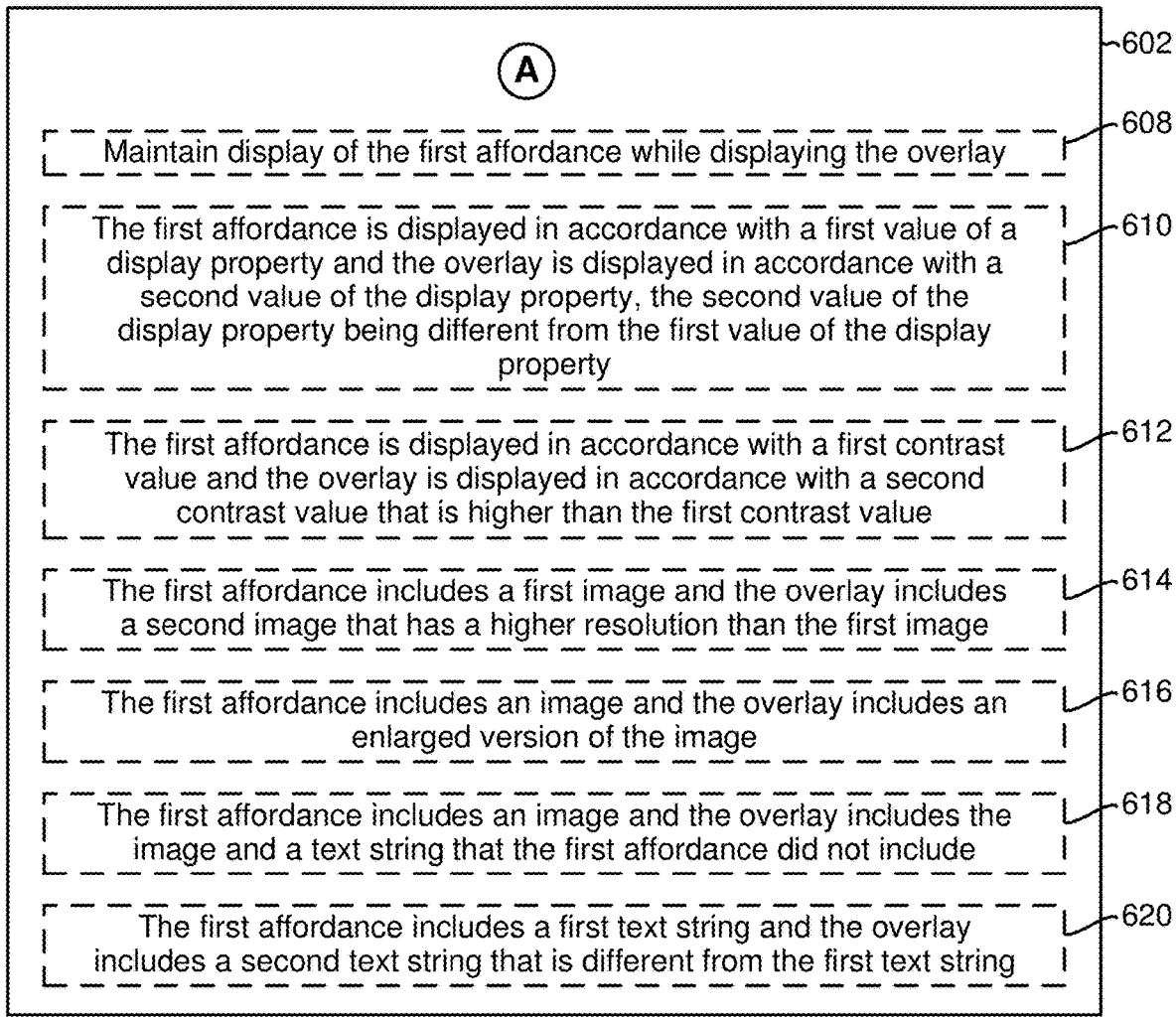

Referring to FIG. 6B, in some embodiments, the device maintains (608) display of the first affordance while displaying the overlay. For example, in FIG. 5B, the device 100 maintains display of the affordance 510*e* while displaying the overlay 540. Maintaining display of the first affordance while displaying the overlay provides a better user experience.

In some embodiments, the first affordance is displayed (610) in accordance with a first value of a display property and the overlay is displayed in accordance with a second value of the display property, the second value of the display property being different from the first value of the display property. In the example of FIG. 5B, the affordance 510*e* is displayed in accordance with a first value of a background color and the overlay 540 is displayed in accordance with a second value of the background color. Displaying the affordance and the overlay in accordance with different values of the display property improves the visibility of the overlay thereby providing a better user experience. Improving the visibility of the overlay reduces the number of erroneous user inputs and enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first affordance is displayed (612) in accordance with a first contrast value and the overlay is displayed in accordance with a second contrast value that is higher than the first contrast value. For example, in FIG. 5B, the affordance 510*e* and the overlay 540 have different contrast values. Displaying the affordance and the overlay in accordance with different contrast values improves the visibility of the overlay thereby improving the operability of the device.

In some embodiments, the first affordance includes (614) a first image and the overlay includes a second image that has a higher resolution than the first image. Including a higher resolution image in the overlay improves the visibility of the overlay and provides a better user experience.

In some embodiments, the first affordance includes (616) an image and the overlay includes an enlarged version of the image. In the example of FIGS. 5A-5B, the affordance 510*e* includes a symbol 512*e* (e.g., an image) and the overlay 540 includes a symbol 552*e* that is an enlarged version of the symbol 512*e* (e.g., an enlarged version of the image). Displaying an enlarged version of the image in the overlay improves the visibility of the affordance thereby providing a better user experience for users who have trouble seeing the image in the affordance. Improving the visibility of the affordance reduces the number of erroneous user inputs and enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first affordance includes (618) an image and the overlay includes the image and a text string that the first affordance did not include. For example, in FIG. 5Q, the overlay 540 includes a text string 554*f* that the affordance 510*f* did not include. Displaying, within the overlay, a text string that the affordance did not include improves the likelihood of the user understanding an operation associated with the affordance. Displaying the text string in the affordance enhances the operability of the device and makes the user-device interface more efficient (e.g., by helping the user understand an operation associated with the affordance) which, additionally, reduces power usage and improves battery life of the device by enabling the user to use the device more quickly and efficiently.

In some embodiments, the first affordance includes (620) a first text string and the overlay includes a second text string that is different from the first text string. In some examples, the second text string is more explanatory than the first text string. Displaying different text strings in the affordance and the overlay can improve the likelihood of the user understanding an operation associated with the affordance.

Figure 6C:
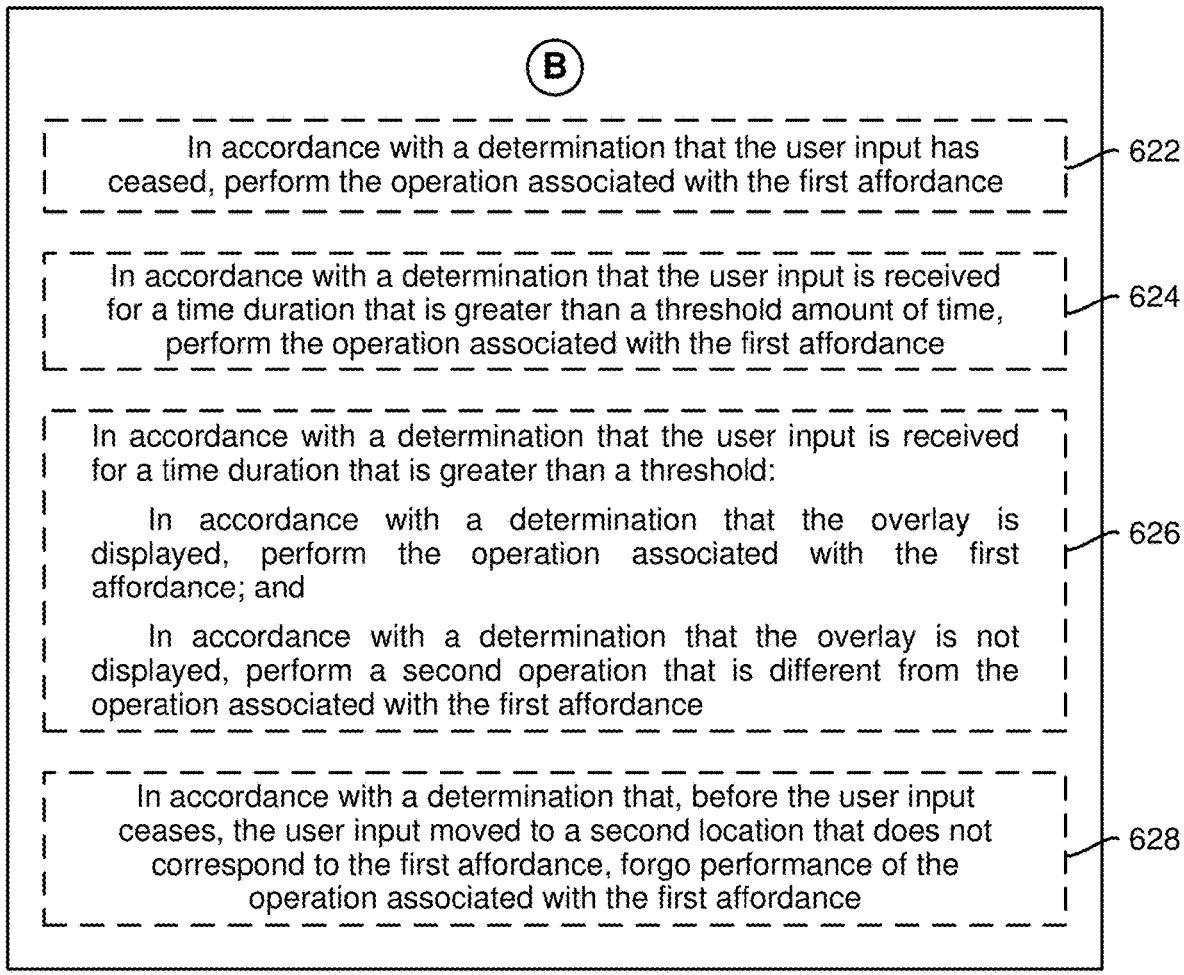

Referring to FIG. 6C, in accordance with a determination that the user input has ceased (e.g., lifted off), the device performs (622) the operation associated with the first affordance. In the example of FIGS. 5C-5D, when the user input 520*a* ceases (e.g., is lifted off), the device displays the search page 505*a*. Performing the operation in response to detecting that the user input has ceased reduces the need for a subsequent user input requesting performance of the operation thereby enhancing the operability of the device and making the user-device interface more efficient (e.g., by reducing subsequence user inputs) which, additionally, reduces power usage and improves battery life of the device by enabling the user to use the device more quickly and efficiently.

In accordance with a determination that the user input is received for a time duration that is greater than a threshold amount of time, the device performs (624) the operation associated with the first affordance. In the example of FIG. 5P, the device 100 displays the search page 505*a* when the time duration 522 associated with the user input 520*a* is greater than the threshold time duration 524. Performing the operation in response to detecting that the user input is held for the threshold amount of time reduces the need for a subsequent user input requesting performance of the operation thereby enhancing the operability of the device and making the user-device interface more efficient (e.g., by reducing subsequent user inputs) which, additionally, reduces power usage and improves battery life of the device by enabling the user to use the device more quickly and efficiently.

In accordance with a determination that the user input is received for a time duration that is greater than a threshold and in accordance with a determination that the overlay is displayed, the device performs (626) the operation associated with the first affordance. In the example of FIG. 5Q, the device 100 displays the new message screen 505*e* after the user input 520*d* is received for a time duration and the overlay 540 has been displayed. Performing the operation associated with the first affordance in response to detecting a user input for a time duration that is greater than a threshold enhances the operability of the device and makes the user-device interface more efficient (e.g., by reducing the need for a subsequent user input requesting performance of the operation) which, additionally, reduces power usage and improves battery life of the device by enabling the user to use the device more quickly and efficiently.

In accordance with a determination that the user input is received for a time duration that is greater than a threshold and in accordance with a determination that the overlay is not displayed, the device performs (626) a second operation that is different from the operation associated with the first affordance. In the example of FIG. 5R, the device 100 does not display the overlay 540. As such, in the example of FIG. 5R, the device 100 displays the previous drafts screen 505f after the user input 520d is received for a time duration. Performing the second operation (e.g., the expert operation) enhances the operability of the device and makes the user-device interface more efficient (e.g., by reducing the need for a subsequent user input requesting performance of the second operation) which, additionally, reduces power usage and improves battery life of the device by enabling the user to use the device more quickly and efficiently.

In accordance with a determination that, before the user input ceases, the user input is moved (e.g., slid) to a second location that does not correspond to the first affordance, the device forgoes (628) performance of the operation associated with the first affordance. In the example of FIGS. 5S-5T, the device 100 forgoes displaying the search page 505a when the user input 520e is moved off the affordance 510e.

Figure 6D:
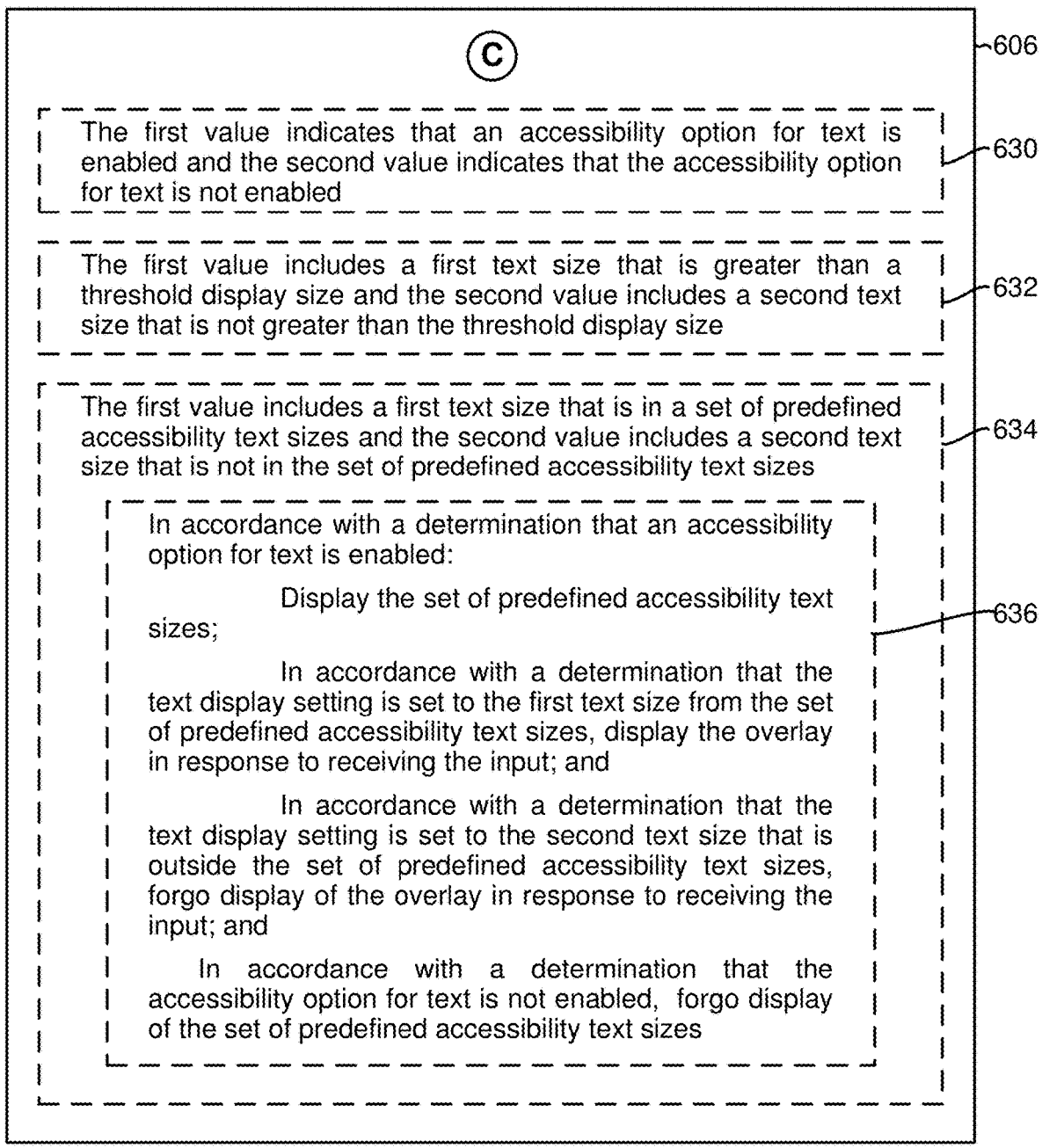

Referring to FIG. 6D, in some embodiments, the first value indicates (630) that an accessibility option for text is enabled and the second value indicates that the accessibility option for text is not enabled. In the example of FIGS. 5E-5F, the ON position 560b of the accessibility size control 560 indicates that the accessibility sizes 570 are available for the text size control 564. In the example of FIGS. 5E-5F, the OFF position 560a of the accessibility size control 560 indicates that the accessibility sizes 570 are not available for the text size control 564. Indicating that the accessibility option for text is enabled lets the user know that the user can select an accessibility option (e.g., one of the accessibility sizes 570) in order to view overlays with enlarged representations of affordances. Indicating the availability of the accessibility option enhances the operability of the device and makes the user-device interface more efficient (e.g., by providing the user with an option to display overlays with enlarged representations of affordances) which, additionally, reduces power usage and improves battery life of the device by enabling the user to use the device more quickly and efficiently.

In some embodiments, the first value includes (632) a first text size that is greater than a threshold display size and the second value includes a second text size that is not greater than the threshold display size. In the example of FIG. 5J, the text size control 564 has a value that is greater than the threshold 572, whereas in FIG. 5I the text size control 564 has a value that is less than the threshold 572. Displaying overlays when the text size is greater than a threshold improves the visibility of affordances for users who are likely having trouble viewing the affordances. Improving the visibility of the affordance reduces the number of erroneous user inputs and enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first value includes (634) a first text size that is in a set of predefined accessibility text sizes and the second value includes a second text size that is not in the set of predefined accessibility text sizes. In the example of FIG. 5H, the text size control 564 has a value that is within the accessibility sizes 570, whereas in FIG. 5G the text size control 564 has a value that is not within the accessibility sizes 570. Displaying overlays when the text size is within the accessibility sizes improves the visibility of affordances for users who are likely having trouble viewing the affordances. Improving the visibility of the affordance reduces the number of erroneous user inputs and enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that an accessibility option for text is enabled, the device displays (636) the set of predefined accessibility text sizes. In the example of FIGS. 5G-5H, the device 100 displays the accessibility sizes 570 when the accessibility size control 560 is in the ON position 560b. In accordance with a determination that the text display setting is set to the first text size from the set of predefined accessibility text sizes, the device displays the overlay in response to receiving the input. In the example of FIG. 5H, the device 100 displays the overlay when the text size control 564 is set to one of the accessibility sizes 570. In accordance with a determination that the text display setting is set to the second text size that is outside the set of predefined accessibility text sizes, the device forgoes display of the overlay in response to receiving the input. In the example of FIG. 5G, the device 100 forgoes display of the overlay when the text size control 564 is not set to one of the accessibility sizes 570. In accordance with a determination that the accessibility option for text is not enabled, the device forgoes display of the set of predefined accessibility text sizes. In the example of FIG. 5E, the device 100 does not display the accessibility sizes 570 when the accessibility size control 560 is in the OFF position 560a. Displaying the overlay when the text display setting is set to one of the accessibility text sizes improves the visibility of affordances for users who are likely having trouble viewing the affordances.

Figure 6E:
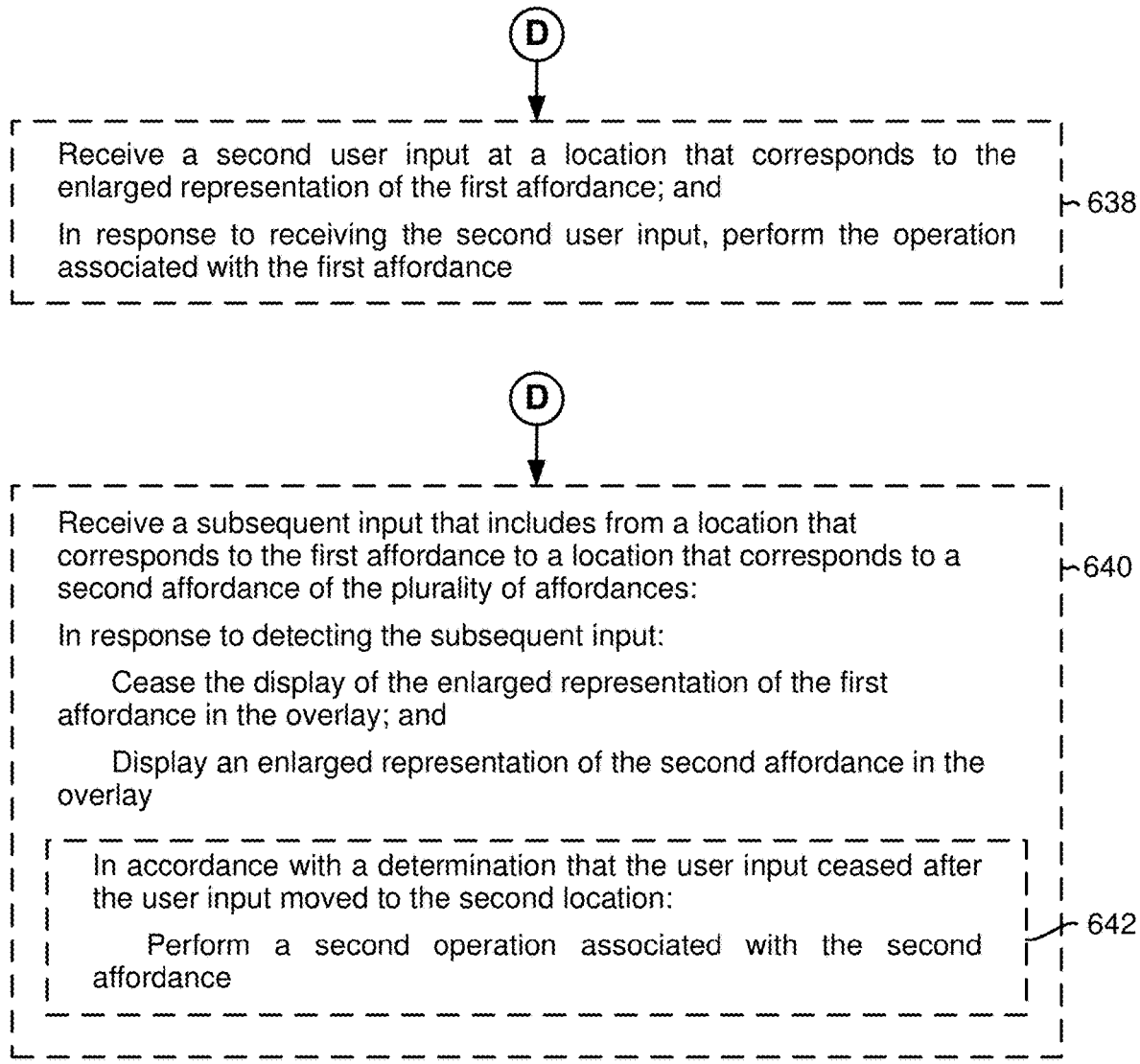

Referring to FIG. 6E, in some embodiments, the device receives (638) a second user input at a location that corresponds to the enlarged representation of the first affordance. In response to receiving the second user input, the device performs the operation associated with the first affordance. In the example of FIGS. 5M-5N, the device 100 receives the user input 520c on the enlarged representation 582c of the affordance 580c. In response to receiving the user input 520c, the device 100 displays the top grossing screen 505c. Performing the operation in response to receiving an input on the enlarged representation of the affordance reduces the likelihood of performing the operation when the user did not intend for the operation to be performed thereby improving the operability of the device.

In some embodiments, the device receives (640) a subsequent input that includes from a location that corresponds to the first affordance to a location that corresponds to a second affordance of the plurality of affordances. In response to detecting the subsequent input, the device ceases the display of the enlarged representation of the first affordance in the overlay, and displays an enlarged representation of the second affordance in the overlay. In the example of FIGS. 5U-5V, the device 100 ceases to display the enlarged representation 550e in the overlay 540 and displays the enlarged representation 550d in response to detecting the sliding of the user input 520f from the affordance 510e to the affordance 510d. Displaying the enlarged representation of the second affordance improves the visibility of the affordance that the user is currently considering activating thereby improving the operability of the device.

In accordance with a determination that the user input ceased after the user input moved to the second location, the device performs (642) a second operation associated with the second affordance. In the example of FIGS. 5W-5X, the device displays the radio station screen 505g when detecting liftoff of the user input 520f after detecting movement of the user input 520f to the affordance 510d. Performing the operation associated with the affordance that was most recently selected enhances the operability of the device and makes the user-device interface more efficient (e.g., by reducing the need for a subsequent user input requesting performance of the operation) which, additionally, reduces power usage and improves battery life of the device by enabling the user to use the device more quickly and efficiently.

The operations in the information processing methods described above are, optionally implemented by running one or more functional modules in information processing apparatus such as general purpose processors (e.g., as described above with respect to FIGS. 1A and 3) or application specific chips. Further, the operations described above with reference to FIGS. 6A-6E are, optionally, implemented by components depicted in FIGS. 1A-1B, or FIG. 3. For example, the receive operation 604 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
    at a device including a touch-sensitive display, a non-transitory memory, and one or more processors coupled with the display and the non-transitory memory:
        displaying, on the touch-sensitive display, a user interface of a first application that includes a plurality of affordances including a first affordance, wherein the first affordance is selectable to perform a respective operation associated with the first application that is currently displayed and the first affordance is displayed at a first size on the touch-sensitive display in the user interface of the first application, and wherein the first affordance is displayed at a first location on the touch-sensitive display;
        receiving a user input at the first location on the touch-sensitive display that corresponds to the first affordance; and
        in response to receiving the user input:
            in accordance with a determination that a text display setting is enabled and has a first value and in accordance with a determination that the user input corresponds to a first input type associated with a press and hold gesture on the touch-sensitive display, maintaining the user interface of the first application as displayed prior to receiving the user input and concurrently displaying, on the touch-sensitive display, an overlay on the user interface that includes a first enlarged representation of the first affordance, wherein the first enlarged representation of the first affordance has a second size that is bigger than the first size, and wherein the overlay is displayed at a second location that is different from the first location;
            in accordance with a determination that the text display setting is enabled and has a second value that is different from the first value and in accordance with a determination that the user input corresponds to the first input type associated with the press and hold gesture on the touch-sensitive display, maintaining the user interface of the first application as displayed prior to receiving the user input and concurrently displaying, on the touch-sensitive display, the overlay on the user interface that includes a second enlarged representation of the first affordance, wherein the second enlarged representation of the first affordance has a third size that is bigger than the first size and different from the second size, and wherein the overlay is displayed at the second location that is different from the first location;
            in accordance with a determination that the text display setting is enabled and in accordance with a determination that the user input corresponds to a second input type associated with a tap gesture on the touch-sensitive display different from the first input type, performing the respective operation associated with the first application; and
            in accordance with a determination that the text display setting is disabled, maintaining the user interface of the first application as displayed prior to receiving the user input and forgoing display of the overlay associated with an enlarged representation of the first affordance.

2. The method of claim 1, wherein the first value includes a first text size that is greater than a threshold display size.

3. The method of claim 1, wherein the first value includes a first text size that is in a set of predefined accessibility text sizes.

4. The method of claim 1, further comprising:
    in accordance with a determination that the user input has ceased, performing the respective operation associated with the first affordance.

5. The method of claim 1, further comprising:
receiving a second user input at the second location on the touch-sensitive display that corresponds to the first or second enlarged representation of the first affordance; and
in response to receiving the second user input, performing the respective operation associated with the first affordance.

6. The method of claim 1, further comprising:
in accordance with a determination that the user input is received for a time duration that is greater than a threshold amount of time, performing the respective operation associated with the first affordance.

7. The method of claim 1, further comprising:
in accordance with a determination that the user input is received for a time duration that breaches a threshold:
in accordance with a determination that the overlay is displayed, performing the respective operation associated with the first affordance; and
in accordance with a determination that the overlay is not displayed, performing a second operation that is different from the respective operation associated with the first affordance.

8. The method of claim 1, wherein the first affordance is displayed in accordance with a first contrast value and the overlay is displayed in accordance with a second contrast value that is higher than the first contrast value.

9. The method of claim 1, wherein the first affordance includes a first image and the overlay includes a second image that has a higher resolution than the first image.

10. The method of claim 1, wherein the first affordance includes an image and the overlay includes the image and a text string that the first affordance did not include.

11. The method of claim 1, wherein the first affordance includes a first text string and the overlay includes a second text string that is different from the first text string.

12. The method of claim 1, further comprising:
in accordance with a determination that, before the user input ceases, the user input moves to a third location that does not correspond to the first affordance, forgoing performance of the respective operation associated with the first affordance.

13. The method of claim 1, further comprising:
receiving a subsequent input that includes movement from the first location to a location that corresponds to a second affordance of the plurality of affordances; and
in response to detecting the subsequent input:
ceasing the display of the enlarged representation of the first affordance in the overlay; and
displaying an enlarged representation of the second affordance in the overlay.

14. The method of claim 13, further comprising:
in accordance with a determination that the user input ceased after the user input moved to the location that corresponds to the second affordance:
performing a second operation associated with the second affordance.

15. The method of claim 1, wherein the plurality of affordances, when selected, cause content to be displayed or operations to be performed that are associated with the first application.

16. An electronic device comprising:
a touch-sensitive display;
one or more processors;
a non-transitory memory storing one or more programs, which, when executed by the one or more processors, cause the electronic device to:
display, on the touch-sensitive display, a user interface of a first application that includes a plurality of affordances including a first affordance, wherein the first affordance is selectable to perform a respective operation associated with the first application that is currently displayed and the first affordance is displayed at a first size on the touch-sensitive display in the user interface of the first application, and wherein the first affordance is displayed at a first location on the touch-sensitive display;
receive a user input at the first location on the touch-sensitive display that corresponds to the first affordance; and
in response to receiving the user input:
in accordance with a determination that a text display setting is enabled and has a first value and in accordance with a determination that the user input corresponds to a first input type associated with a press and hold gesture on the touch-sensitive display, maintain the user interface of the first application as displayed prior to receiving the user input and concurrently display, on the touch-sensitive display, an overlay on the user interface that includes a first enlarged representation of the first affordance, wherein the enlarged representation of the first affordance has a second size that is bigger than the first size, and wherein the overlay is displayed at a second location that is different from the first location;
in accordance with a determination that the text display setting is enabled and has a second value that is different from the first value and in accordance with a determination that the user input corresponds to the first input type associated with the press and hold gesture on the touch-sensitive display, maintain the user interface of the first application as displayed prior to receiving the user input and concurrently display, on the touch-sensitive display, the overlay on the user interface that includes a second enlarged representation of the first affordance, wherein the second enlarged representation of the first affordance has a third size that is bigger than the first size and different from the second size, and wherein the overlay is displayed at the second location that is different from the first location;
in accordance with a determination that the text display setting is enabled and in accordance with a determination that the user input corresponds to a second input type associated with a tap gesture on the touch-sensitive display different from the first input type, performing the respective operation associated with the first application; and
in accordance with a determination that the text display setting is disabled, maintain the user interface of the first application as displayed prior to receiving the user input and forego display of the overlay associated with an enlarged representation of the first affordance.

17. The method of claim 1, wherein displaying the overlay is in response to determining that the user input corresponds to a first input type, and the method further comprising:
performing the respective operation associated with the first affordance in response to determining that the user input corresponds to a second input type that is different from the first input type.

18. The electronic device of claim 16, wherein the one or more programs further cause the electronic device to:
- receive a second user input at the second location on the touch-sensitive display that corresponds to the first or second enlarged representation of the first affordance; and
- in response to receiving the second user input, perform the respective operation associated with the first affordance.

19. The electronic device of claim 16, wherein the plurality of affordances, when selected, cause content to be displayed or operations to be performed that are associated with the first application.

20. A non-transitory computer readable storage medium storing one or more programs, the one or more programs comprising instructions, which, when executed by an electronic device with a touch-sensitive display, cause the electronic device to:
- display, on the touch-sensitive display, a user interface of a first application that includes a plurality of affordances including a first affordance, wherein the first affordance is selectable to perform a respective operation associated with the first application that is currently displayed and the first affordance is displayed at a first size on the touch-sensitive display in the user interface of the first application, and wherein the first affordance is displayed at a first location on the touch-sensitive display;
- receive a user input at the first location on the touch-sensitive display that corresponds to the first affordance; and
- in response to receiving the user input:
    - in accordance with a determination that a text display setting is enabled and has a first value and in accordance with a determination that the user input corresponds to a first input type associated with a press and hold gesture on the touch-sensitive display, maintain the user interface of the first application as displayed prior to receiving the user input and concurrently display, on the touch-sensitive display, an overlay on the user interface that includes a first enlarged representation of the first affordance, wherein the enlarged representation of the first affordance has a second size that is bigger than the first size, and wherein the overlay is displayed at a second location that is different from the first location;
    - in accordance with a determination that the text display setting is enabled and has a second value that is different from the first value and in accordance with a determination that the user input corresponds to the first input type associated with the press and hold gesture on the touch-sensitive display, maintain the user interface of the first application as displayed prior to receiving the user input and concurrently display, on the touch-sensitive display, the overlay on the user interface that includes a second enlarged representation of the first affordance, wherein the second enlarged representation of the first affordance has a third size that is bigger than the first size and different from the second size, and wherein the overlay is displayed at the second location that is different from the first location;
    - in accordance with a determination that the text display setting is enabled and in accordance with a determination that the user input corresponds to a second input type associated with a tap gesture on the touch-sensitive display different from the first input type, performing the respective operation associated with the first application; and
    - in accordance with a determination that the text display setting is disabled, maintain the user interface of the first application as displayed prior to receiving the user input and forego display of the overlay associated with an enlarged representation of the first affordance.

21. The non-transitory computer readable storage medium of claim 20, wherein the instructions further cause the electronic device to:
- in accordance with a determination that the user input has ceased, perform the respective operation associated with the first affordance.

22. The non-transitory computer readable storage medium of claim 20, wherein the instructions further cause the electronic device to:
- receive a second user input at the second location on the touch-sensitive display that corresponds to the first or second enlarged representation of the first affordance; and
- in response to receiving the second user input, perform the respective operation associated with the first affordance.

23. The non-transitory computer readable storage medium of claim 20, wherein the plurality of affordances, when selected, cause content to be displayed or operations to be performed that are associated with the first application.

* * * * *